(12) United States Patent  
Karpin et al.

(10) Patent No.: US 9,377,909 B2
(45) Date of Patent: Jun. 28, 2016

(54) TOUCHSCREEN DATA PROCESSING

(71) Applicant: PARADE TECHNOLOGIES, LTD., Santa Clara, CA (US)

(72) Inventors: Oleksandr Karpin, Lviv (UA); Igor Kolych, Lviv (UA); Andriy Maharyta, Lviv (UA); Ihor Musijchuk, Lviv (UA); Victor Kremin, Lviv (UA); Jan-Willem van de Waerdt, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/018,596

(22) Filed: Sep. 5, 2013

(65) Prior Publication Data
US 2014/0022211 A1    Jan. 23, 2014

Related U.S. Application Data

(63) Continuation of application No. 13/927,054, filed on Jun. 25, 2013, now abandoned, which is a continuation-in-part of application No. 13/829,734, filed on Mar. 14, 2013.

(Continued)

(51) Int. Cl.
G06F 3/045   (2006.01)
G06F 3/044   (2006.01)
G06F 3/041   (2006.01)

(52) U.S. Cl.
CPC .............. *G06F 3/044* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| 5,566,341 | A | 10/1996 | Roberson et al. |
| 5,730,165 | A | 3/1998 | Philipp |
| 6,618,443 | B1* | 9/2003 | Kim et al. ................ 375/240.21 |
| 6,954,867 | B2 | 10/2005 | Casebolt et al. |
| 6,961,015 | B2 | 11/2005 | Kernahan et al. |
| 7,124,312 | B2 | 10/2006 | Casebolt et al. |

(Continued)

FOREIGN PATENT DOCUMENTS

EP    1912202 A2    4/2008

OTHER PUBLICATIONS

Yin, Lin, Yang, Ruking, and Neuvo, Yrjo. Weighted Median Filters: a Tutorial. IEEE Transactions on Circuits and Systems-II: Analog and Digital Signal Processing, vol. 43, No. 3, Mar. 1996. pp. 157-162.*

(Continued)

*Primary Examiner* — Kent Chang
*Assistant Examiner* — Nathan Brittingham
(74) *Attorney, Agent, or Firm* — Morgan, Lewis & Bockius LLP

(57) ABSTRACT

Capacitive touch sensors and touchscreen data processing methods are provided. In one embodiment, the method includes sequentially integrating and converting charge from each of a plurality of sensing capacitors in an array to digital data, the digital data including sample values corresponding to a measured capacitance for each of the plurality of sensing capacitors. Noise is then separated from useful information by filtering the sample values on a sample-by-sample basis. Finally, the filtered sample values are summed and a position of at least one contact on the array determined using the filtered capacitance values. Other embodiments are also provided.

15 Claims, 25 Drawing Sheets

Related U.S. Application Data

(60) Provisional application No. 61/781,986, filed on Mar. 14, 2013, provisional application No. 61/782,139, filed on Mar. 14, 2013, provisional application No. 61/673,336, filed on Jul. 19, 2012, provisional application No. 61/673,350, filed on Jul. 19, 2012.

(56) References Cited

U.S. PATENT DOCUMENTS

| | | | |
|---|---|---|---|
| 7,693,929 B2 | 4/2010 | Giacalone | |
| 8,004,502 B2* | 8/2011 | Keam | 345/175 |
| 8,059,102 B2 | 11/2011 | Rimon et al. | |
| 8,067,948 B2 | 11/2011 | Sequine | |
| 8,089,288 B1 | 1/2012 | Maharita | |
| 8,169,238 B1 | 5/2012 | Maharita et al. | |
| 8,294,687 B1 | 10/2012 | Ksondzyk | |
| 8,432,170 B1 | 4/2013 | Walsh et al. | |
| 8,436,263 B2 | 5/2013 | Kremin | |
| 2005/0110769 A1 | 5/2005 | DaCosta et al. | |
| 2008/0224912 A1* | 9/2008 | Wang | 341/155 |
| 2010/0053097 A1 | 3/2010 | Goh et al. | |
| 2010/0168538 A1* | 7/2010 | Keenan et al. | 600/365 |
| 2011/0270112 A1 | 11/2011 | Manera et al. | |
| 2012/0007821 A1* | 1/2012 | Zaliva | 345/173 |
| 2012/0013546 A1 | 1/2012 | Westhues et al. | |
| 2012/0044206 A1 | 2/2012 | Philipp | |
| 2012/0121019 A1* | 5/2012 | Sato | 375/240.16 |
| 2012/0133080 A1 | 5/2012 | Moussa et al. | |
| 2012/0194472 A1 | 8/2012 | DaCosta et al. | |
| 2012/0256638 A1 | 10/2012 | Antwerpen et al. | |
| 2012/0268416 A1 | 10/2012 | Pirogov et al. | |
| 2013/0169561 A1 | 7/2013 | Park et al. | |
| 2013/0222210 A1 | 8/2013 | Wang et al. | |
| 2013/0257799 A1* | 10/2013 | Lamont et al. | 345/174 |

OTHER PUBLICATIONS

S.A. Fahmy, P.Y.K. Cheung, W. Luk, High-throughput one-dimensional media and weighted median filters of FPGA, Jan. 22, 2009, IET Computers & Digital Techniques, pp. 385, 387-388.*

Intel Atom Processor E6xx Series Datasheet, Intel Coporation, Document No. 324208, Revision 004US, Jul. 2011, 298 pages.

International Search Report for International Application No. PCT/US13/50878 dated Jan. 31, 2014; 3 pages.

Styles, Harry, "Hardware Acceleration of Large Scale Capacitance Calculation," [retrieved from Jul. 3, 2014], retrieved from internet <URL: ftp://cm.bell-labs.com/who/old/mencer/henryreport.pdf>; 6 pages.

USPTO Advisory Action for U.S. Appl. No. 13/829,734 dated Sep. 29, 2014; 3 pages.

USPTO Final Rejection for U.S. Appl. No. 13/829,734 dated Jul. 23, 2014; 12 pages.

USPTO Non Final Rejection for U.S. Appl. No. 13/829,734 dated Apr. 1, 2014; 10 pages.

USPTO Non Final Rejection for U.S. Appl. No. 13/829,734 dated Nov. 20, 2013; 9 pages.

USPTO Requirement for Restriction for U.S. Appl. No. 13/829,734 dated Jul. 30, 2013; 7 pages.

Written Opinion of the International Searching Authority for International Application No. PCT/US13/50878 dated Jan. 31, 2014; 6 pages.

van de Waerdt, Office Action, U.S. Appl. No. 13/829,734, Feb. 6, 2015, 17 pgs.

van de Waerdt, Final Office Action, U.S. Appl. No. 13/829,734, May 28, 2015, 18 pgs.

van de Waerdt, Notice of Allowance, U.S. Appl. No. 13/829,734, Jan. 13, 2016, 7 pgs.

* cited by examiner

FIGURE 4

TOUCHSCREEN DATA PROCESSING

CROSS-REFERENCE TO RELATED APPLICATIONS

This application is a continuation of co-pending U.S. application Ser. No. 13/927,054, filed Jun. 25, 2013, which is a continuation-in-part of co-pending U.S. application Ser. No. 13/829,734, filed Mar. 14, 2013, which claims the benefit of U.S. Provisional Application Nos. 61/781,986 and 61/782,139, filed on Mar. 14, 2013, U.S. Provisional Application Nos. 61/673,336 and 61/673,350 filed on Jul. 19, 2012, which are incorporated by reference herein.

TECHNICAL FIELD

This disclosure relates to the field of touch-sensors and, in particular, touchscreen data processing.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger or a stylus pen. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

FIG. 4 illustrates embodiments of pluralities of nodes that may be processed by the hardware accelerator.

DETAILED DESCRIPTION

Figure 1:
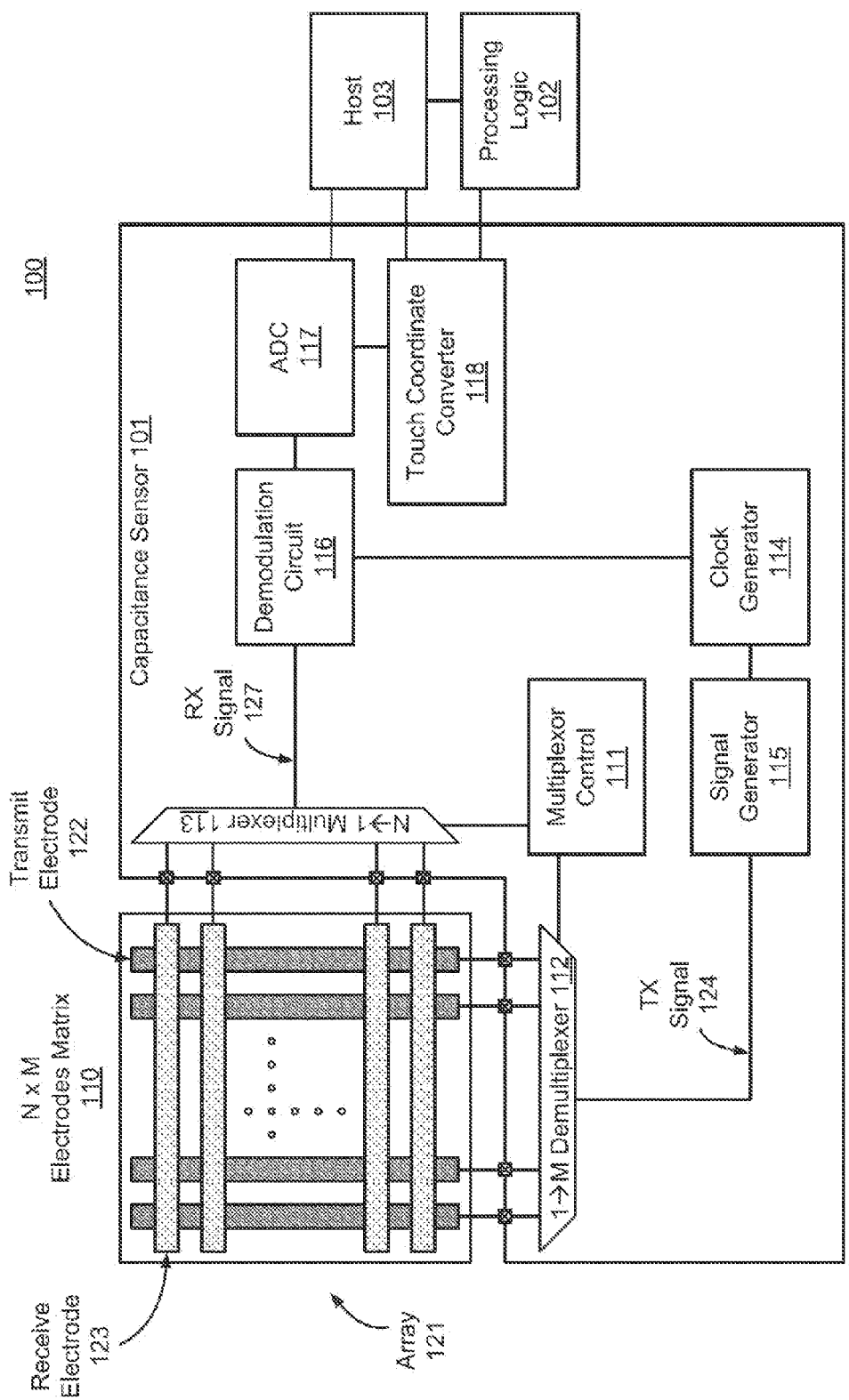
FIG. 1 is a block diagram illustrating an embodiment of an electronic system that processes touch sensor data.

The following description sets forth numerous specific details such as examples of specific systems, components, methods, and so forth, in order to provide a good understanding of several embodiments of the present invention. It will be apparent to one of ordinary skill in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention. Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

An embodiment of a capacitive sensor array may include sensor elements arranged such that each unit cell corresponding to an intersection between sensor elements may include a main trace and one or more primary subtraces branching away from the main trace. In one embodiment, a sensor element may also include one or more secondary subtraces branching from a primary subtrace, or one or more tertiary subtraces branching from a secondary subtrace. In one embodiment, a sensor array having such a pattern may have decreased signal disparity and reduced manufacturability problems as compared to other patterns, such as a diamond pattern. Specifically, a capacitive sensor array with sensor elements having main traces and subtraces branching from the main trace, such as a totem pole pattern, may be manufactured with decreased cost and increased yield rate, as well as improved optical quality.

An embodiment of such a capacitive sensor array may include a first and a second plurality of sensor elements each intersecting each of the first plurality of sensor elements. Each intersection between one of the first plurality of sensor elements and one of the second plurality of sensor elements may be associated with a corresponding unit cell. A unit cell may be a single node or pixel of capacitance measurement on the capacitive sensor array. In one embodiment, a unit cell corresponding to an intersection may be understood as an area including all locations on the surface of the sensor array that are nearer to the corresponding intersection than to any other intersection between sensor elements.

In one embodiment of a capacitive sensor array, each of the second plurality of sensor elements includes a main trace that crosses at least one of the plurality of unit cells, and further includes, within each unit cell, a primary subtrace that branches away from the main trace. In one embodiment, the primary subtrace may be one of two or more primary subtraces branching symmetrically from opposite sides of the main trace, resembling a "totem pole". Alternatively, the primary subtraces may branch asymmetrically from the main trace.

FIG. 1 is a block diagram illustrating one embodiment of a capacitive touch sensor array 121 and a capacitance sensor 101 that converts measured capacitances to coordinates. The coordinates are calculated based on measured capacitances. In one embodiment, touch sensor array 121 and capacitance sensor 101 are implemented in a system such as electronic system 100. Electronic system 100 may be a touchscreen or touchpad, which may part of a mobile phone, a tablet PC, a laptop PC or other computing device. The electronic system may also be a front panel display with an array of buttons with sensing electrodes tied to each one specifically or in a matrix. Touch sensor array 121 includes a matrix 110 of N×M electrodes (N receive electrodes and M transmit electrodes), which further includes transmit (TX) electrode 122 and receive (RX) electrode 123. Each of the electrodes in matrix 110 may be connected with capacitance sensor 101 through demultiplexer 112 and multiplexer 113.

Capacitance sensor 101 may include multiplexer control 111, demultiplexer 112 and multiplexer 113, clock generator 114, signal generator 115, demodulation circuit 116, and analog-to-digital converter (ADC) 117. ADC 117 is further coupled with touch coordinate converter 118. Touch coordinate converter 118 outputs a signal to the processing logic 102. Processing logic may output to host 103 in one embodiment. In another embodiment, host 103 may receive data directly from ADC 117 or touch coordinate converter 118.

The transmit and receive electrodes in the matrix 110 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 122 is capacitively coupled with receive electrode 123 at the point where transmit electrode 122 and receive electrode 123 overlap.

Clock generator 114 supplies a clock signal to signal generator 115, which produces a TX signal 124 to be supplied to the transmit electrodes of touch sensor array 121. In one embodiment, the signal generator 115 includes a set of switches that operate according to the clock signal from clock generator 114. The switches may generate a TX signal 124 by periodically connecting the output of signal generator 115 to a first voltage and then to a second voltage, wherein said first and second voltages are different.

The output of signal generator 115 is connected with demultiplexer 112, which allows the TX signal 124 to be applied to any of the M transmit electrodes of touch sensor array 121. In one embodiment, multiplexer control 111 controls demultiplexer 112 so that the TX signal 124 is applied to each transmit electrode 122 in a controlled sequence. Demultiplexer 112 may also be used to ground, float, or connect an alternate signal to the other transmit electrodes to which the TX signal 124 is not currently being applied.

Because of the capacitive coupling between the transmit and receive electrodes, the TX signal 124 applied to each transmit electrode induces a current within each of the receive electrodes. For instance, when the TX signal 124 is applied to transmit electrode 122 through demultiplexer 112, the TX signal 124 induces an RX signal 127 on the receive electrodes in matrix 110. The RX signal 127 on each of the receive electrodes can then be measured in sequence by using multiplexer 113 to connect each of the N receive electrodes to demodulation circuit 116 in sequence. In one embodiment, multiple multiplexers may allow RX signals to be received in parallel by multiple demodulation circuits.

The mutual capacitance associated with each intersection between a TX electrode and an RX electrode can be sensed by selecting every available combination of TX electrode and an RX electrode using demultiplexer 112 and multiplexer 113. To improve performance, multiplexer 113 may also be segmented to allow more than one of the receive electrodes in matrix 110 to be routed to additional demodulation circuits 116. In an optimized configuration, wherein there is a 1-to-1 correspondence of instances of demodulation circuit 116 with receive electrodes, multiplexer 113 may not be present in the system.

When an object, such as a finger or stylus, approaches the matrix 110, the object causes a decrease in the mutual capacitance between only some of the electrodes. For example, if a finger or stylus is placed near the intersection of transmit electrode 122 and receive electrode 123, the presence of the finger will decrease the mutual capacitance between electrodes 122 and 123. Thus, the location of the finger on the touchpad can be determined by identifying the one or more receive electrodes having a decreased mutual capacitance in addition to identifying the transmit electrode to which the TX signal 124 was applied at the time the decreased mutual capacitance was measured on the one or more receive electrodes.

By determining the mutual capacitances associated with each intersection of electrodes in the matrix 110, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal (RX signal 127) is rectified by demodulation circuit 116. The rectified current output by demodulation circuit 116 can then be filtered and converted to a digital code by ADC 117.

The digital code is converted to touch coordinates indicating a position of an input on touch sensor array 121 by touch coordinate converter 118. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, touch sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 2:
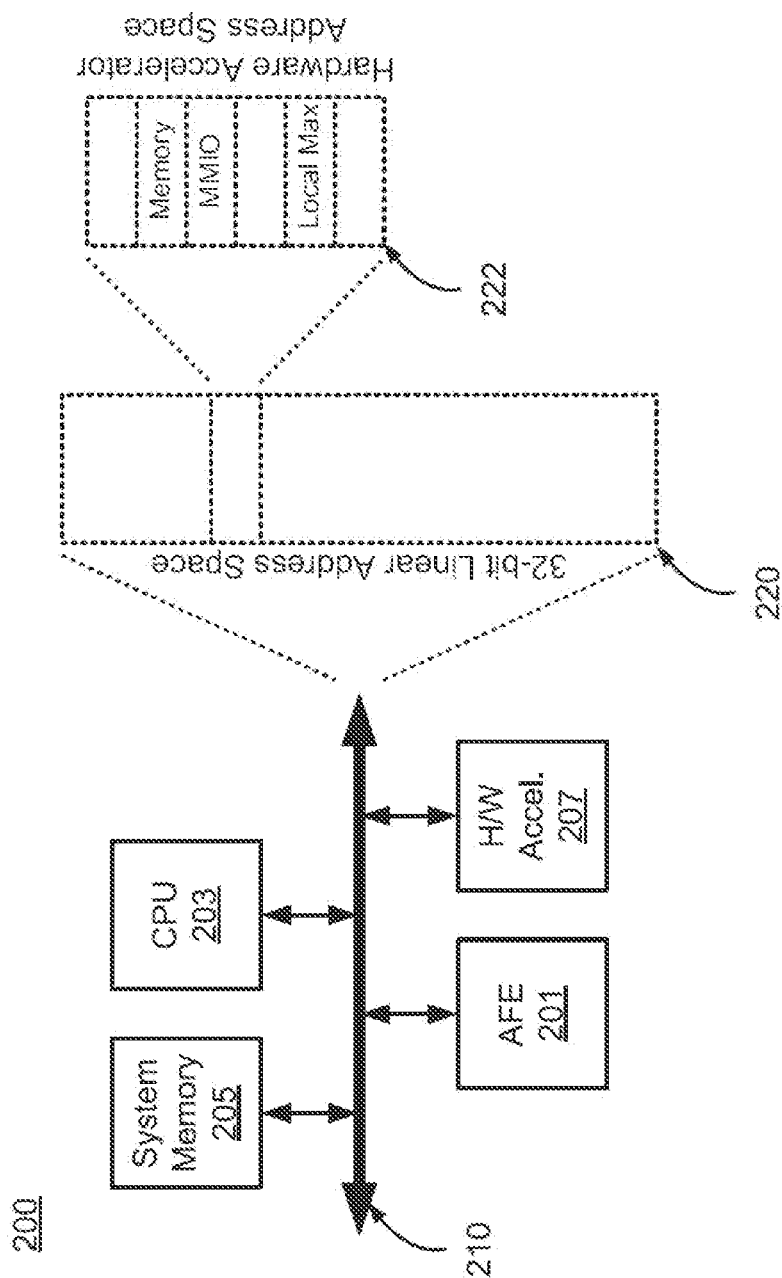
FIG. 2 illustrates an embodiment of system comprising a hardware accelerator.

FIG. 2 illustrates one embodiment of a touch sensing system 200 with a hardware accelerator for local maximum calculation. The touch sensing system 200 may include an analog front end (AFE) 201 coupled to a data bus 210. The analog front end may be similar to the circuit illustrated in FIG. 1 and comprising demultiplexers 112 and 113, multiplexor control 111, clock generator 114, signal generator 115, demodulation circuit 116, and a digital conversion similar to ADC 117. The analog front end may be configured to convert mutual capacitance that exists between transmit electrodes 122 and receive electrodes 123 of array 121 to digital values than may be stored in a memory array. Touch sensing system 200 may include a central processing unit (CPU) 203 configured to execute commands and control the AFE 201 as well as other circuits necessary for touch sensing operation. In one embodiment, the CPU may be configured to identify local maxima rather than of the hardware accelerator. In other embodiments, the CPU may be configured to execute capacitance baselining routines, adjust thresholds for noise and contact detection, identify and track contacts on the array 121, or process gestures. Program operations and commands, as well as capacitance data including raw values, baseline corrected values and any calibration information may be stored in system memory 205 and accessed by the CPU 203, AFE 201, hardware accelerator 207 or other system elements not shown through bus 210. Access and control of the several parts of touch sensing system may be accomplished by using a 32-bit address space 220, part of which is reserved for the hardware accelerator as the hardware accelerator address space 222.

Figure 3A:
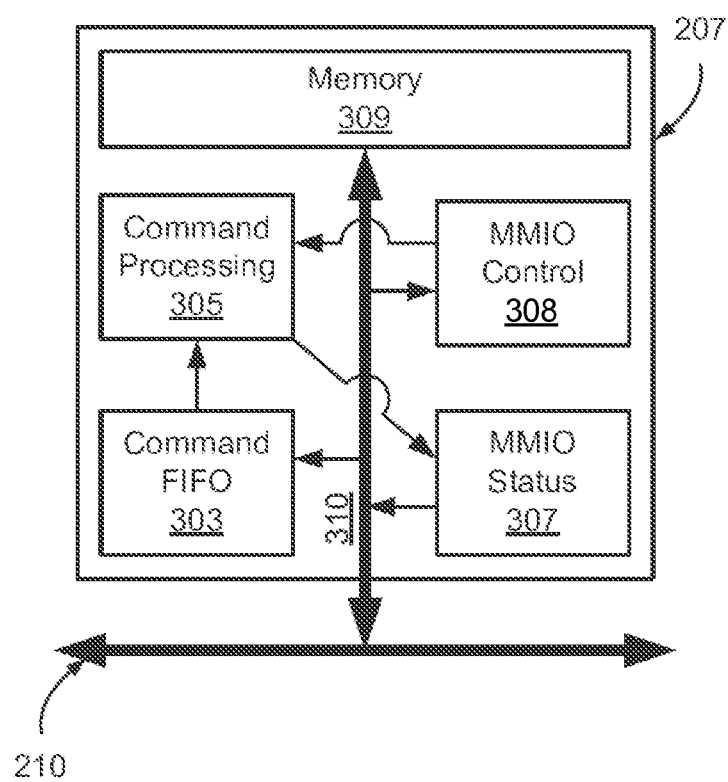
FIG. 3A illustrates a block diagram of one embodiment of a hardware accelerator.

FIG. 3A illustrates one embodiment of hardware accelerator 207 comprising a command processing module 301 configurable to process commands from command FIFO module 303. Command FIFO module 303 may be configured to receive commands from CPU 203 (FIG. 2) via hardware accelerator bus 310 and bus 210 and hold them in a queue for command processing module 305. Command processing module 305 may be configured to update memory mapped I/O (MMIO) status module 307 after receiving control information from MMIO control module 308. Command processing module 305 may also be the portion of the hardware accelerator configured fetch touch sensing array information from the system memory 205 (FIG. 2) and to perform the local maximum detection on those values. MMIO control module may receive control information from CPU 203 (FIG. 2) via hardware accelerator bus 310 and bus 210. MMIO status information may be passed to other modules within hardware accelerator 207 via hardware accelerator bus 310 or to other modules of the touch sensing system 200 (FIG. 2) through bus 210. Hardware accelerator 207 may comprise a memory array 309 configured to store the touch sensing array information to be processed for local maxima identification. While memory mapped JO is used in this embodiment, it is understood that this for purposes of explanation only. Any kind of JO may be used by the hardware accelerator.

Figure 3B:
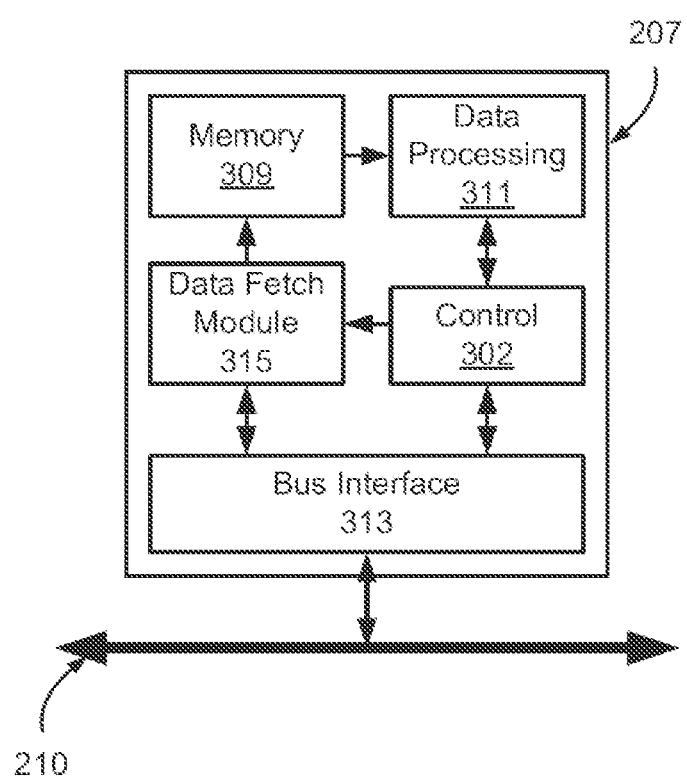
FIG. 3B illustrates a block diagram of one embodiment of a hardware accelerator.

FIG. 3B illustrates another embodiment of hardware accelerator 207 comprising a control module 302, which may include portions of the command processing module 301 and command FIFO module 303 of FIG. 3A. Control module 302 may send commands to data processing module 311 and data fetch module 315. Data fetch module 315 may be configured to access system memory array 309 through bus interface 313 and store touch sensing array information such as the measured capacitance values that are necessary for local maxima identification in memory array 309. Capacitance values may be any representation of capacitance on the capacitance sensor. In one embodiment, capacitance values may be linear measurements of accumulated voltage measured with the integration circuit. In another embodiment, the measured voltage on the integration circuit may be attenuated. In still another embodiment the capacitance value may be a digital representation of a capacitance similar to an output of an analog-to-digital converter. Data processing module 311, responding to commands from control module 302 may access memory array 309 to identify local maxima and pass them back to the touch sensing system 200 (FIG. 2) for storage in the system memory array 205 and additional processing through control module 302 and bus interface 313. Control module 302 may also receive additional commands or requests for local maxima locations through bus interface 313.

Figure 3C:
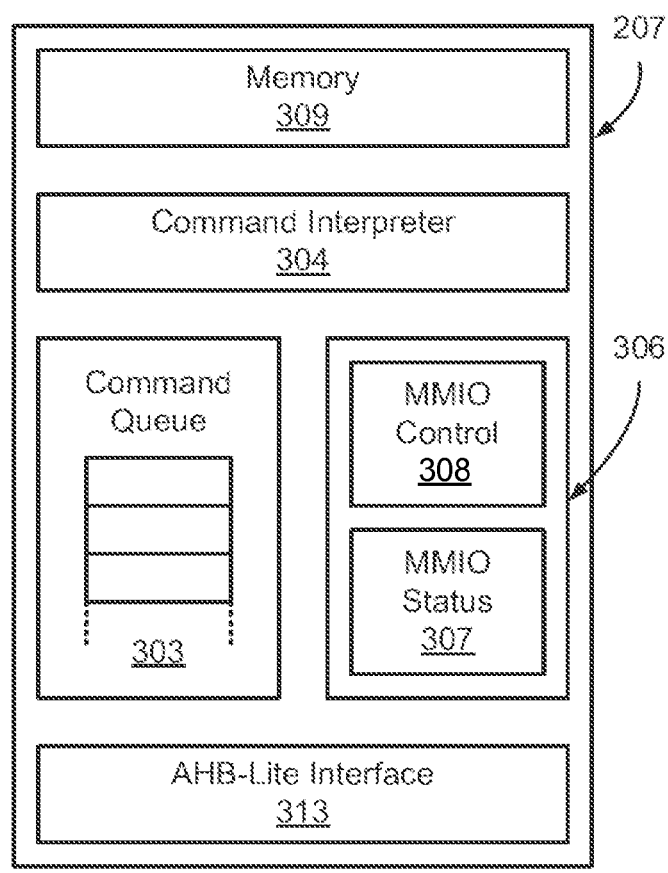
FIG. 3C illustrates a block diagram of one embodiment of a hardware accelerator.

FIG. 3C illustrates another embodiment of hardware accelerator 207 comprising a command queue 303 configured to store commands from the CPU and other system elements for processing by hardware accelerator 207. Command interpreter 304 may be configured to receive commands from the command queue 303 and to process them using information stored in memory array 309. Memory array 309 may be configured to store programming information for command interpreter 304 as well as capacitance map information necessary for identifying local maxima. Hardware accelerator 207 may also comprise MMIO module 306 comprising an MMIO control module 308 and a MMIO status module 307 each configurable to access and control the memory registers for commands necessary for hardware accelerator. Commands and information may be passed into and out of, as well as within the hardware accelerator through AHB-Light Interface 313.

The memory array 309 of hardware accelerator 207 may be accessed (both read and write) by multiple system elements simultaneously. In one embodiment, the memory array may be written to by the host controller and simultaneously read from by the hardware accelerator local maximum detection logic (described below). In another embodiment, the local maximum detection logic may write to memory array 309 such that an external element of system 200 may read locations of local maxima from memory array 309.

Hardware accelerator 207 may be used to detect local maxima on the capacitance sensing array. Local maxima may be indicative of touch locations may be used to calculate the precise location of at least one contact on the capacitance sensing array. The location of the at least one contact on the array capacitance sensing array may then be used to detect gestures, move a cursor across a display unit, or perform other user interface operations.

By performing the local maxima detection in the hardware accelerator rather than in the main program, other operations that may be necessary for touch sensing array operation may not be burdened by the local maxima detection may run separately. Additionally, the system memory array and CPU are available and unburdened since the hardware accelerator may use separate local memory and digital logic for performing necessary comparisons for local maxima detection.

Figure 4:
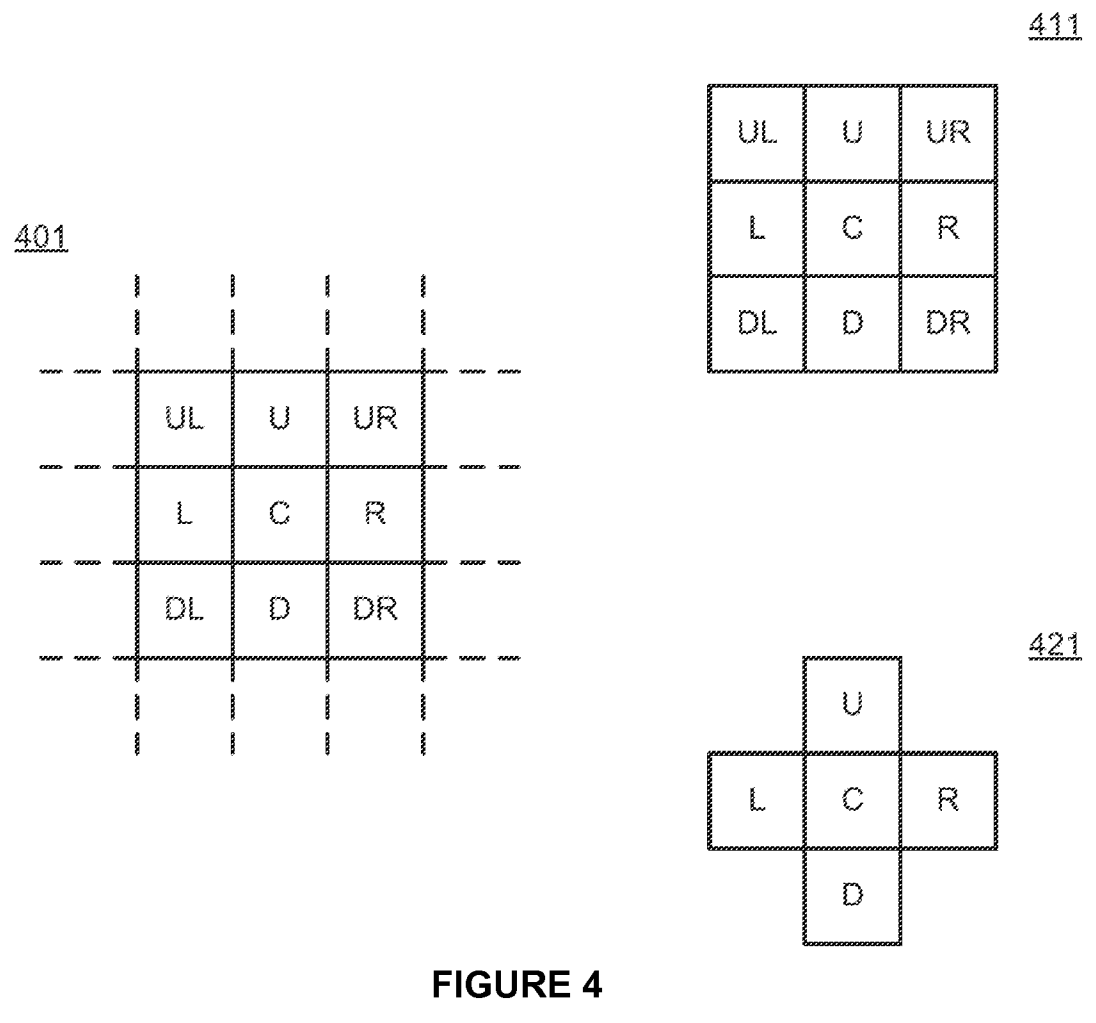

FIG. 4 illustrates one representation of the data that may be used in identifying local maxima with the hardware accelerator 207. Element 401 represents nine nodes around and including a center node, C, that are used in determining if the center node, C, is a local maximum. The value of the center node, C, is compared with each of the values for the nodes above, U, below, D, left, L, and right, R. The value of the center node, C, is also compared with each of the values for the nodes at the diagonals, UL, UR, DR, and DL. If the value of the center node is greater than each of the values for the eight nodes surrounding it, it is determined to be a local maximum. Element 411 shows the nine-node window that is used for determining whether the center node is a local maximum. Element 421 shows another embodiment where only the nodes above, below, left, and right of the center node are used in the determination of the center node as a local maximum. In another embodiment, only the nodes located diagonally from the center node may be used. In still another embodiment, a collection of nodes surrounding the center node that is greater in number than nine may be used.

If the center node is equal to one of the surrounding nodes, in one embodiment, the processing may look to the nodes on each side of the equal nodes to determine which of the equal nodes is the actual local maximum. That is, if both the center node, C, and the left node, L, both have the same value, a comparison may be made between the right node, R, and the node immediately left of the left node, L. If R is greater, then C will be determined to be the center node as the sum of C and R is greater than the sum of L and the node immediately to the left of L.

Figure 5:
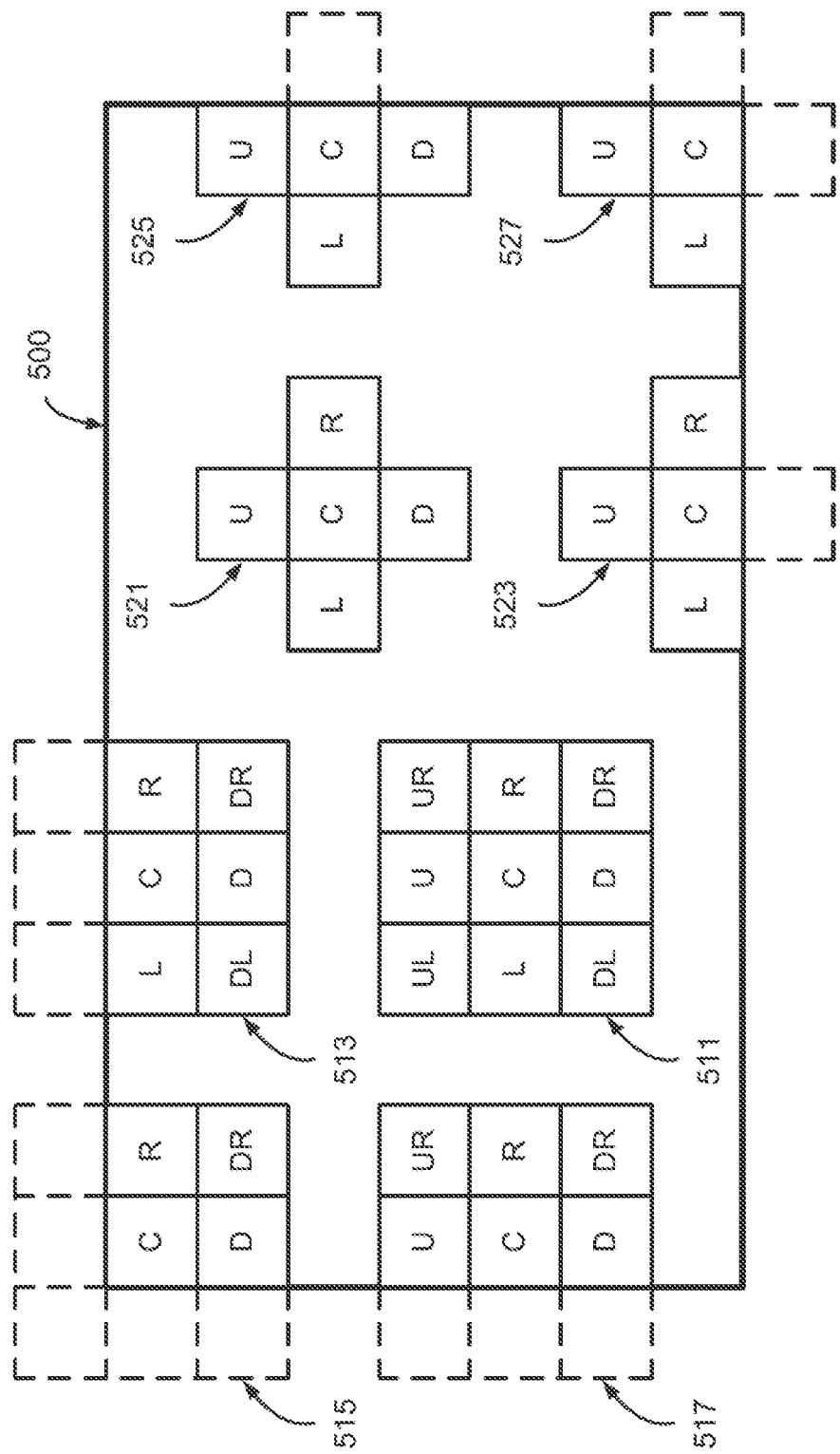
FIG. 5 illustrates embodiments of pluralities of nodes that may be processed by the hardware accelerator in various locations on a touch sensor array.

FIG. 5 illustrates the elements 411 and 421 of FIG. 4 as they may be found in an embodiment of an array of nodes, such as array 500. The elements 511 and 521 may be processed normally and all comparisons made between the surrounding nodes and the center node, C. However, if the node that is being processed is located on an edge of the array or in a corner, there are fewer nodes to compare to the center node. For example, element 513 does not have nodes UL, U, or UR. These are therefore excluded from the local maximum determination for center node C of element 513. Similarly for element 523, node U does not exist. It is excluded from the local maximum determination for center node C for element 523.

While the embodiments of FIGS. 4 and 5 illustrate the comparison of a center node to the surrounding nodes either in whole or in part, there exist other peak detection schemes based on signals of a node under test and parameters that determine its status as a peak. The embodiments of FIGS. 4 and 5, and their application in the embodiments below are intended to be representative of peak detection generally. Hardware accelerator 207 (FIGS. 2 and 3A-C) may be configured to process capacitance data for a plurality of nodes using any method, including but not limited to a logical comparison of a limited number of sensors, slope detection, and gradient detection. Additionally, the elements of FIGS. 4 and 5 show only two embodiments of groups of nodes that may be used for the comparison. Other embodiments comprising different collections of sensors may be used for the elements.

Figure 6:
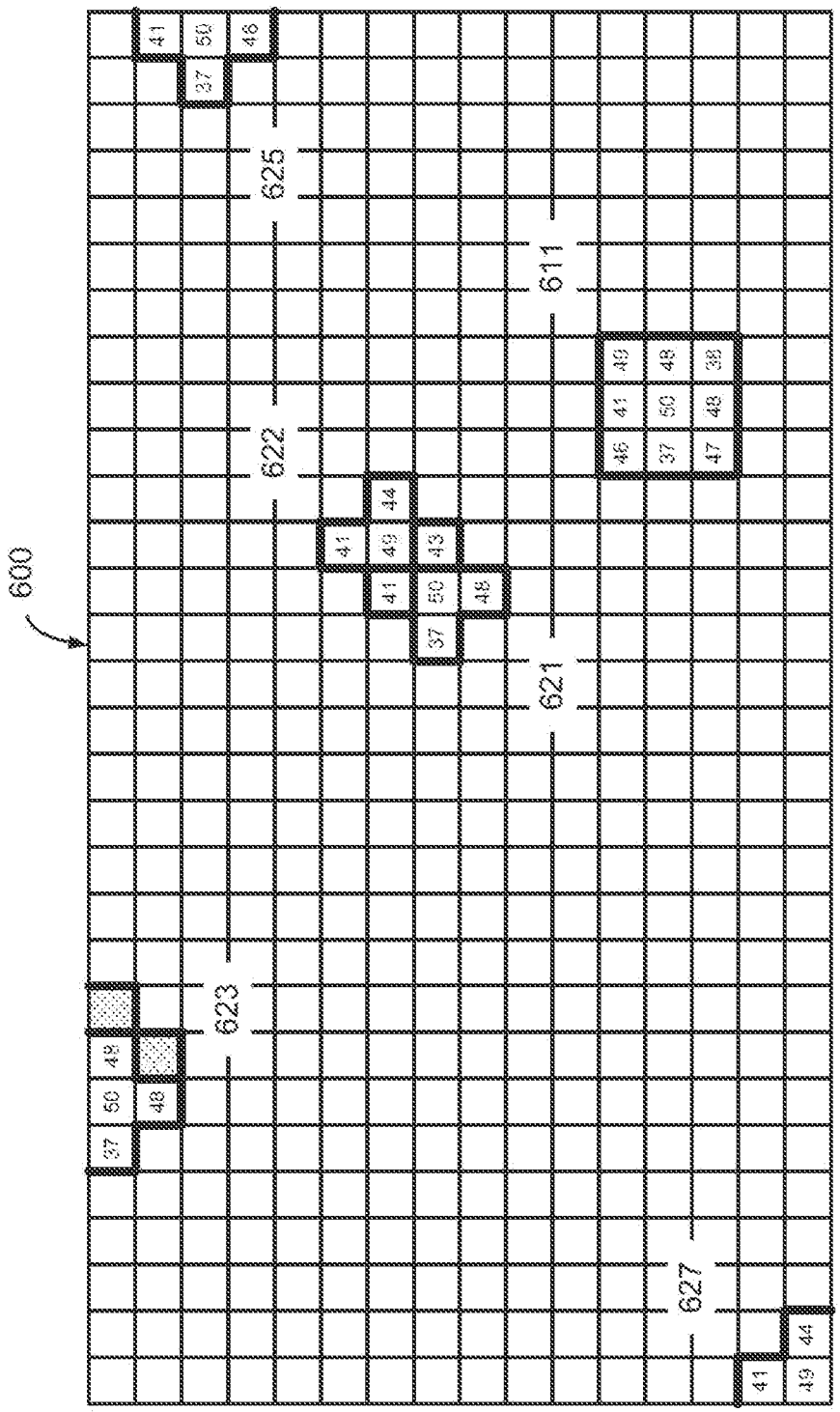
FIG. 6 illustrates embodiments of pluralities of nodes that may be processed by the hardware accelerator and the values at each node that may be processed.

FIG. 6 illustrates an embodiment of several elements as described in FIGS. 4 and 5 in a 30×21 node array. The values that are used in the determination of the center nodes of each are displayed. The center node for element 623 has a value of 50. When compared to the ride node (37), the left node (48) and the lower node (48), the center of element 623 is determined to be a local maximum. If a similar comparison was to be made wherein the right node of element 623 was the center, the comparison would show that the center node was not the local maximum. Similar comparisons as were made for element 623 may be made for elements 611, 625 and 627. Element 611 uses a comparison of the center node, C, with a value of 50 to all of the nodes surrounding it. Because 50 is greater than all the values for the surrounding nodes, it is determined to be the local maximum.

621 and 622 share some nodes that may be used in determining whether each is a local maximum. The right node (43) of 621 is the same as the lower node of 622. Similarly, the upper node (41) of element 621 is the same as the left node of 622. The comparison of each of the center nodes to the four nodes in each of the cardinal directions yields two local maxima. However, if a nine-node comparison were to be used as discussed above, the local maximum of element 622 would not be detected since its value is lower than the value of the center of element 621.

Figure 7:
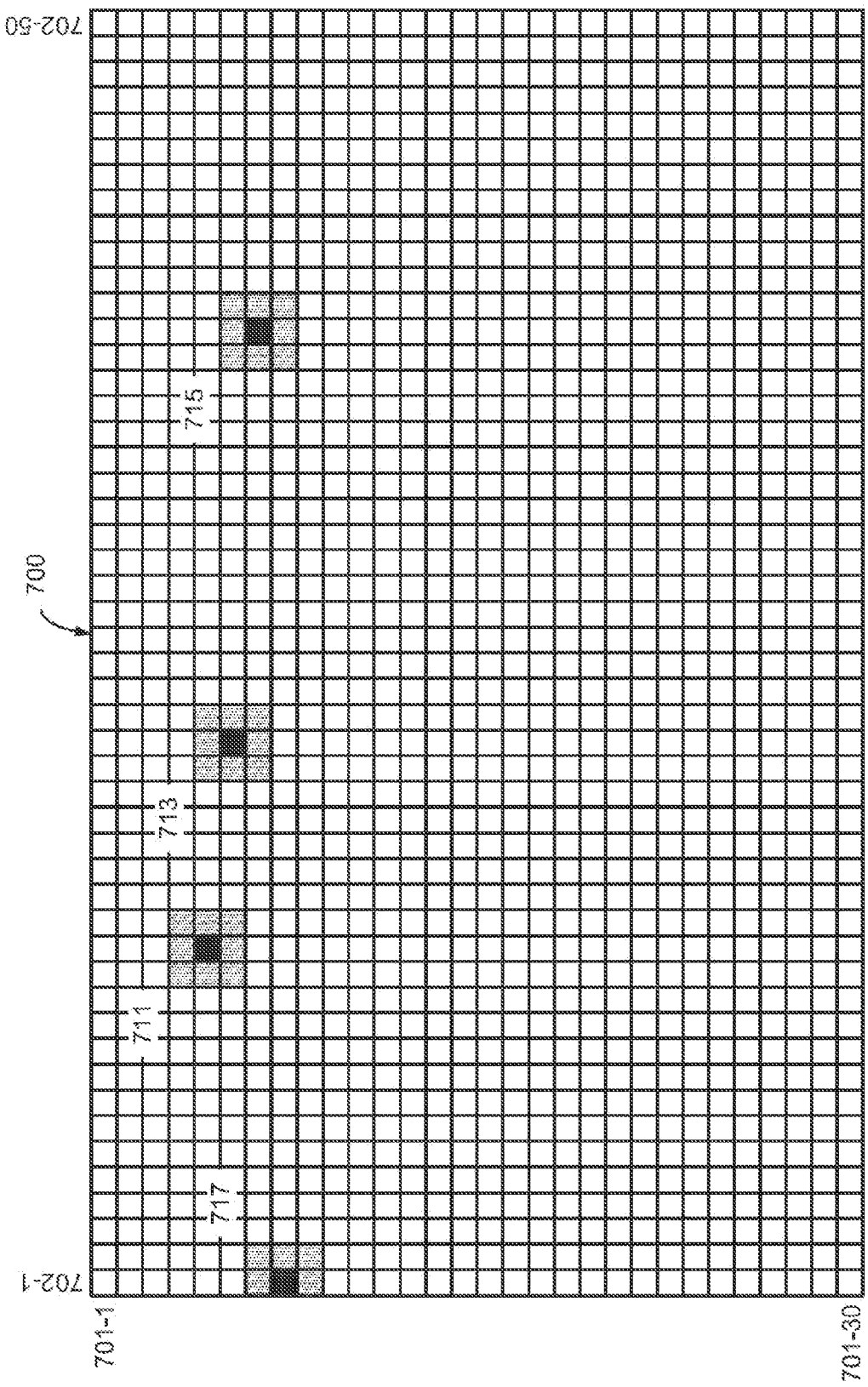
FIG. 7 illustrates a 50×30 array of nodes than may be processed by the hardware accelerator and four touches on the touch sensor array.

FIG. 7 illustrates an embodiment of a touch sensor array 700 that has 50 rows and 30 columns. The touch sensor array has 30 rows starting with row 701-1 and ending with 701-30. The touch sensor array 700 has 50 columns starting with column 702-1 and ending with column 702-50. For each node of touch sensor array there may multiple values stored, including the raw values of measured capacitance that are output from ADC 117 of FIG. 1, baseline correction factors that may be used to eliminate parasitic capacitance, noise thresholds for various types of noise, and difference counts from the baseline capacitance and the measured capacitance for a specific scan and most recent scan of the array. It is the difference counts that are most effectively used in the determination of local maxima since they are representative of only the change in capacitance that is caused by the presence of a conductive object.

In one embodiment, the hardware accelerator may be used to find any local maxim in row 701-5. To do this, the hardware accelerator may fetch the difference counts from the system memory array 205 and storing that value in a local memory array 309 (FIGS. 3A-C). In one embodiment, since the hardware accelerator uses the nodes in the rows immediately above and below the node to be processed, difference count values for rows 701-4 and 701-6 may also be fetched from the system memory array 205 and stored in local memory array 309.

Local memory array 309 may be a 256-byte memory array 800 as shown in FIGS. 8A-D. In the embodiment shown in FIG. 8A, the data from rows 701-4 through 701-6 may be stored in the first available bytes. The hardware accelerator may then use nodes 711-1 through 711-3, 711-4 through 711-6, and 711-7 through 711-9 to determine if node 711-5 is a local maxima. In one embodiment, the values that are fetched from the system memory array 205 sent to or written to the local memory array 309 of hardware accelerator 207 are shown as window 811.

Figure 8A:
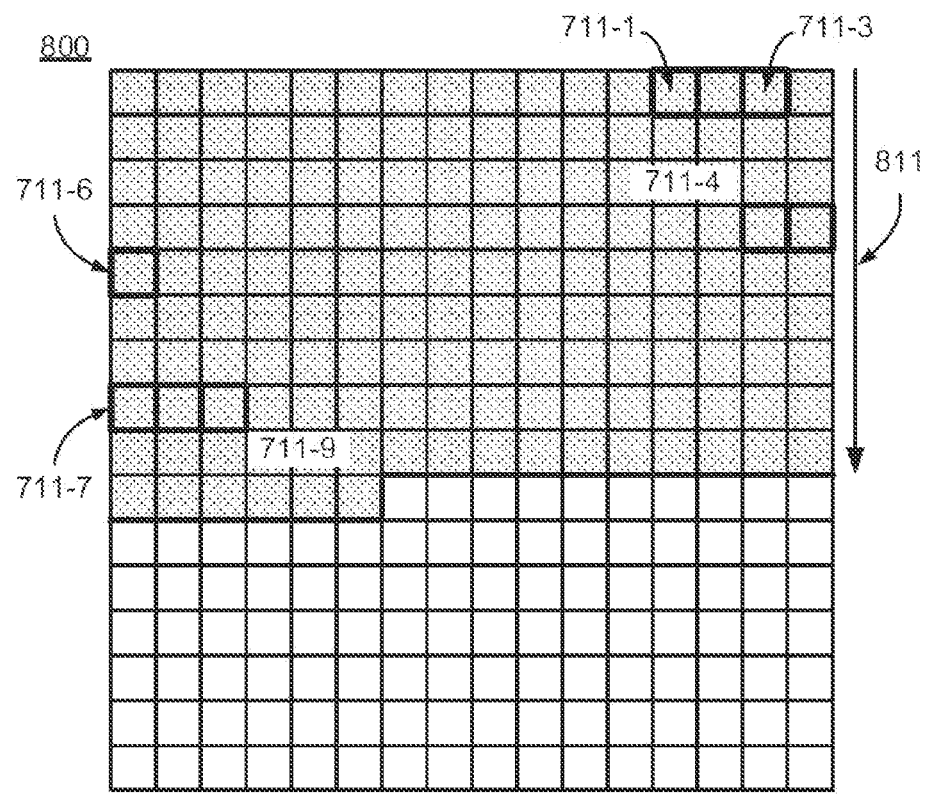
FIG. 8A illustrates an example of the memory used to process the first touch of FIG. 7.
Figure 8B:
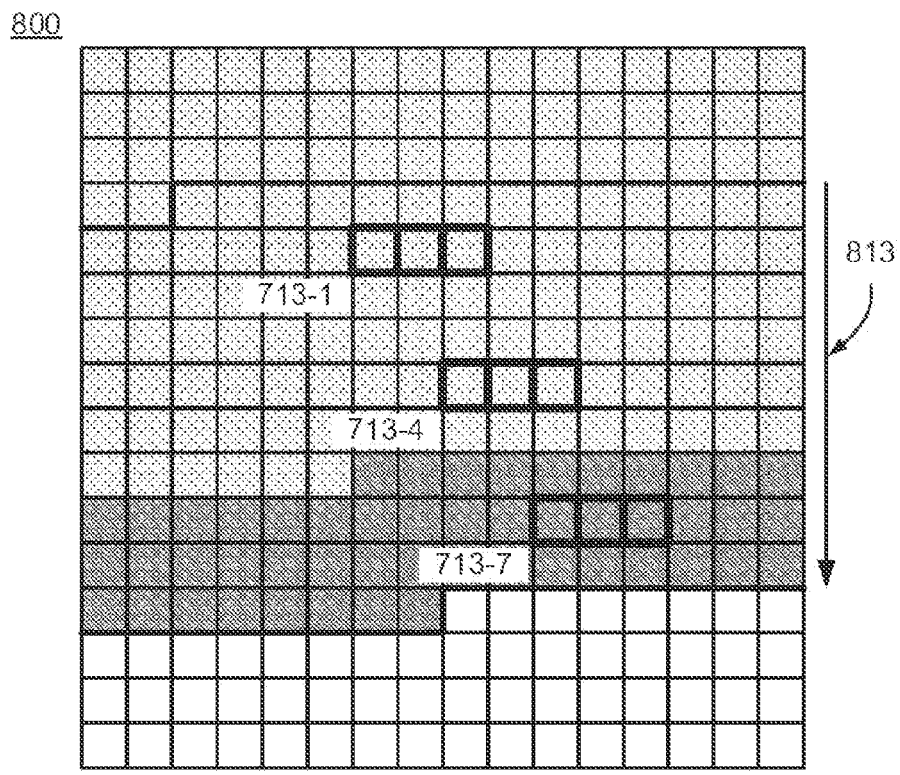
FIG. 8B illustrates an example of the memory used to process the second touch of FIG. 7.

To determine if the center node of element 713 of FIG. 7 is a local maximum an additional row of values 701-7 is required, while row 701-4 is no longer required. Therefore, the hardware accelerator fetches the additional data and stores it in the next available memory cells of memory array 800 as shown in FIG. 8B. The window of values 813 is then used to determine if node 713-5 is a local maximum by comparing nodes 713-1 through 713-3, 713-4 through 713-6, and 713-7 through 713-9. The 50 new values are copied into the next available memory cells, requiring an additional 50 bytes.

Figure 8C:
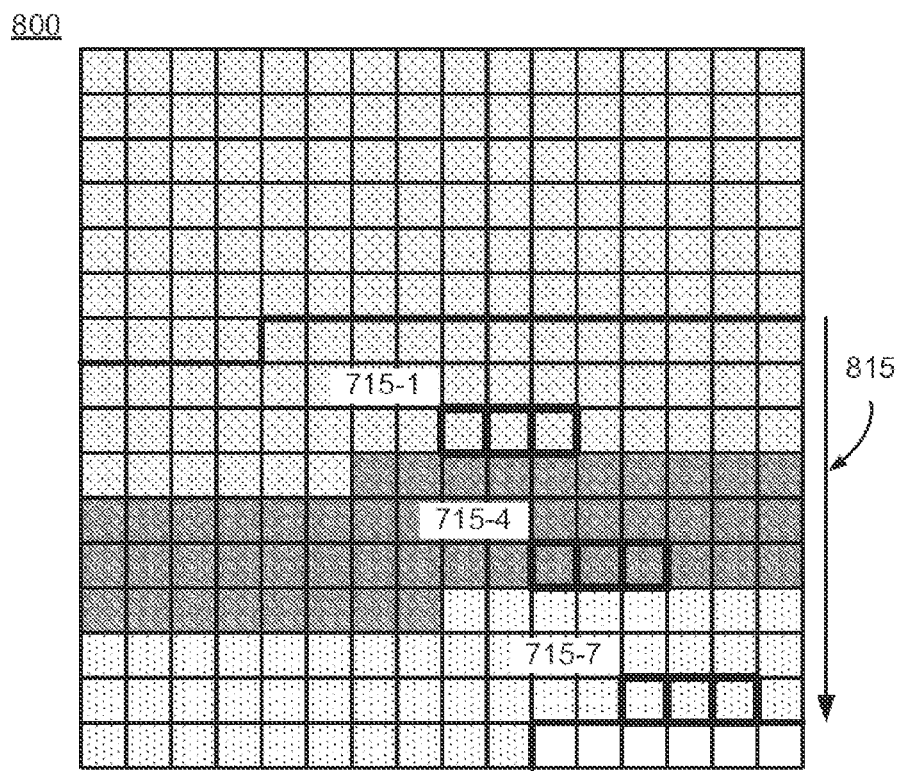
FIG. 8C illustrates an example of the memory used to process the third touch of FIG. 7.

To determine if the center node of element 715 of FIG. 7 is a local maximum an additional row of values 701-8 is required, while row 701-5 is no longer required. Therefore, the hardware accelerator fetches the additional data and stores it in the next available memory cells of memory array 800 as shown in FIG. 8C. The window of values 815 is then used to determine if node 715-5 is a local maximum by comparing nodes 715-1 through 715-3, 715-4 through 715-6, and 715-7 through 715-9. The 50 new values are copied into the next available memory cells, requiring an additional 50 bytes.

Figure 8D:
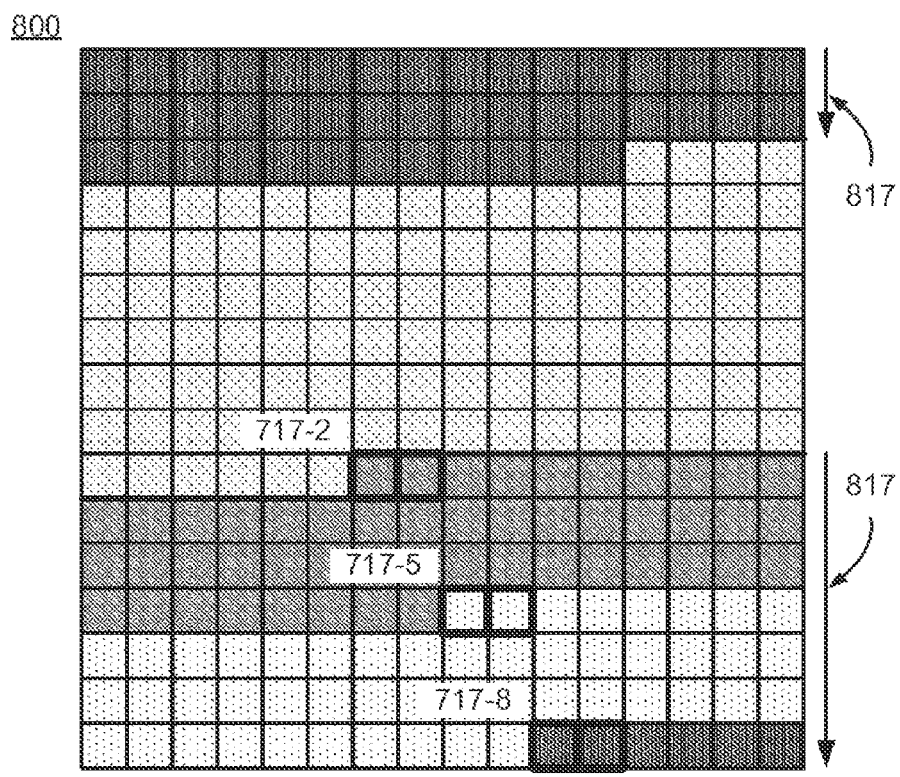
FIG. 8D illustrates an example of the memory used to process the second touch of FIG. 7.

To determine if the center node of element 715 of FIG. 7 is a local maximum an additional row of values 701-9 is required, while row 701-6 is no longer required. Therefore, the hardware accelerator fetches the additional data and stores it in the next available memory cells of memory array 800 as shown in FIG. 8D. Because the local memory 309 is now full, only the last six empty bytes are stored without overwriting data. The first 44 bytes of memory array 800 are then overwritten with the remaining values for row 701-9 because the values for 701-4 needed, as stated previously. The window of values 817 is then used to determine if node 717-5 is a local maximum by comparing nodes 717-2 and 717-3, 717-5 and 717-6, and 717-8 and 717-9. Because element 717 is located at the edge of the array, there are no nodes for UL, L, and DL as shown as element 517 in FIG. 5.

The hardware accelerator looks at each node that is in the row to be processed and then fetches the next row of data. That is, if the necessary data is already in the hardware accelerator local memory array 309, there is no need for a fetching operation to get values from the system memory array 205. This accelerates the local maximum identification process.

Figure 9:
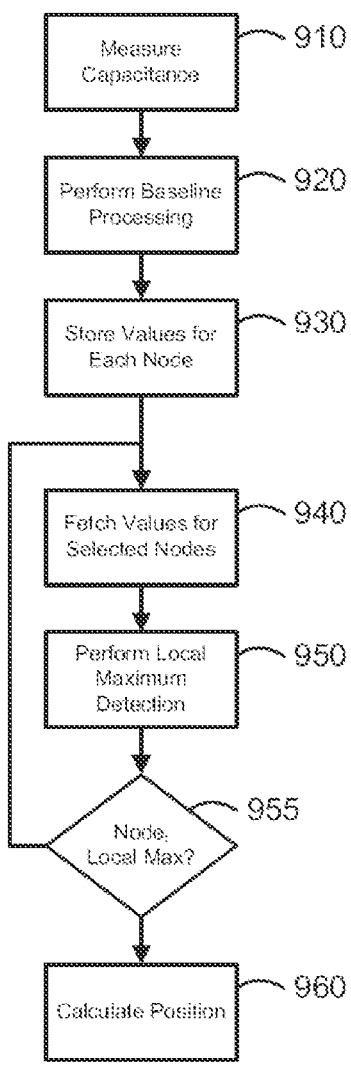
FIG. 9 illustrates one embodiment of a method for sensing a capacitance sense array and determining position of contacts thereon.

One embodiment of the overall method 900 for scanning a panel and determining local maxima by the system illustrated in FIG. 2 is shown in FIG. 9. The capacitance sensing array is first scanned and capacitance measured in step 910. The scanning may be completed by the capacitance sensor of FIG. 1. Baseline processing of the raw values from ADC 117 may then be performed in step 920. While baseline processing is listed, any processing that is not dependent on the identification of local maxima may be performed in this step. This includes noise detection and avoidance, median filtering, and other global operations. Difference counts may be then stored in a system memory array in step 930, the difference values representative of the change in capacitance of each node from a stored baseline value. While difference counts are used for this embodiment, any digital representation of the capacitance for the nodes may be calculated, stored, and used by the hardware accelerator 207. The hardware accelerator 207 may then fetch the difference values for the necessary rows in step 940 and store those values in local memory array 309. Local maxima may then be determined in step 950 according to the FIGS. 5-8 and the associated description. Local maxima may be stored in separate memory cells within the hardware accelerator local memory array 309 or sent to the touch sensing system for storage in another memory array, such as system memory array 205. In decision step 955, the hardware accelerator checks to see that the entire touch sensing array has been processed. If it has not the next row of values is fetched from system memory array 205 and stored in hardware accelerator local memory array 309 so that the next row may be processed according to FIGS. 7 and 8A-D. If the entire touch sensing array has been processed, the hardware accelerator may then communicate to the CPU or other processing circuit in touch sensing system 200 that the position of each contact that is identified by the local maxima may be calculated. In one embodiment, this may be done by touch coordinate converter 118 of FIG. 1.

There are many touch coordinate conversion methods that may be used in block 960, including but not limited to: centroid calculation, linear interpolation, Gaussian curve processing, virtual mass, method of borders, gradients, etc. Operation of the hardware accelerator is not dependent on any specific touch coordinate conversion method. Rather, the hardware accelerator tells the touch coordinate conversion method which data are to be used in determining the position of contacts on the touch sensing array.

Figure 10:
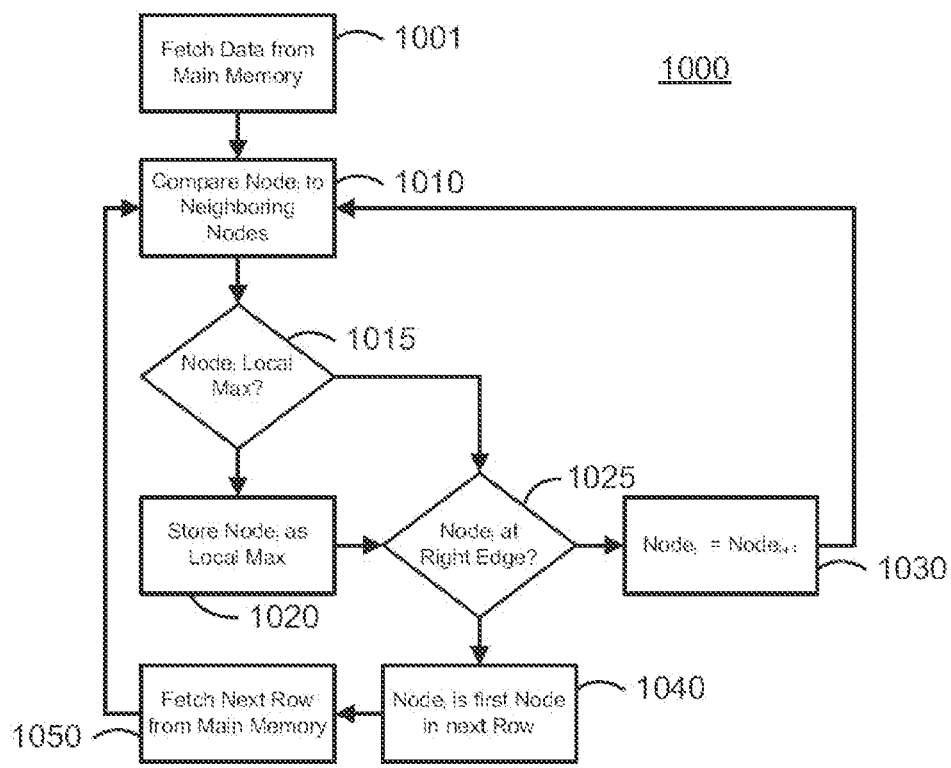
FIG. 10 illustrates one embodiment of a method identifying local maxima by the hardware accelerator.

FIG. 10 illustrates one embodiment of the method 1000 of processing values with the hardware accelerator. First, data is fetched from the system memory array in step 1001. This is similar to the fetch values step 940 of FIG. 9. Next, each node, $Node_i$, is compared to the neighboring nodes. This is represented by the center node, C, of FIG. 4 compared to the surrounding nodes of elements 411 and 421 in step 1010. The comparison may be accomplished by comparing each of the nodes surrounding $Node_i$. This may be done by comparing $Node_i$ to the eight nodes around it as shown in element 411 in FIG. 4, it may be performed by comparing $Node_i$ to only the nodes in cardinal directions from $Node_i$ as shown in element 421, or it may be performed by comparing a different set of nodes representative of the surrounding nodes to $Node_i$. If $Node_i$ is a local maximum, that node is stored as such in a memory array (e.g., memory array 309 of FIGS. 3A-C or directly to system memory 205 of FIG. 2) in decision step 1015. If it is not, or after $Node_i$ is stored as the local maximum, decision block 1025 determines if $Node_i$ is on the right edge of the touch sensing array (e.g., node C of elements 525 and 527 of FIG. 5, or the intersection of column 702-50 and any of the rows of FIG. 7). If it is not, the next node to the right, $Node_{i+1}$ becomes Node, in step 1030 and the method restarts at step 1010. If $Node_i$ is at the right edge of the touch sensing array, the first node (left-most node) of the next row becomes $Node_i$ in step 1040 and the next row of data is fetched from the system memory array (e.g., system memory 205 of FIG. 2) and stored in the hardware accelerator local memory array (e.g., memory array 309 of FIGS. 3A-C) in step 1050 and the method restarts again at step 1010.

While only the local maximum detection is described in the executed commands of the hardware accelerator, other tasks may also be performed. These may include baseline calculation, difference count processing, or other basic mathematical operations. The commands for these operations may be loaded into command FIFO 303 and processed by command processing module 305 of FIG. 3A. They may be also handled by data processing module 311 of FIG. 3B or command queue 303 and command processor 304 of FIG. 3B.

In another aspect the present disclosure is directed to cycle-by-cycle or sample-by-sample filtering and/or scanning to suppress noise.

Figure 11:
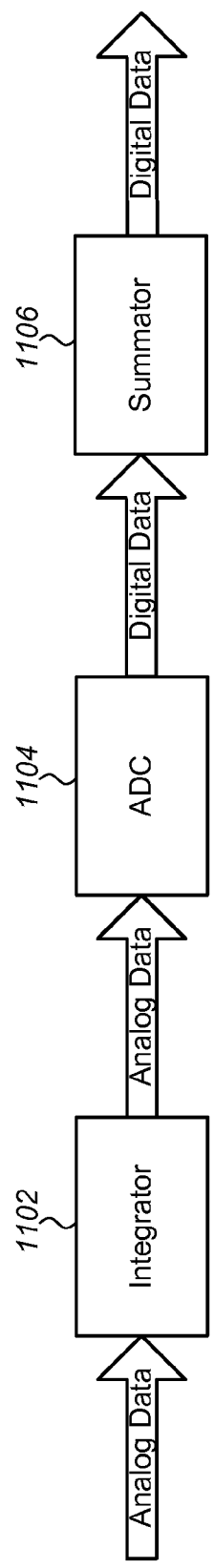
FIG. 11 is a block diagram illustrating a conventional scheme for suppressing noise in a touch sensor array using integration followed by averaging.

Conventional touch sensor arrays suffer from poor immunity to noise arising from an adjacent liquid crystal display (LCD) and chargers of the device in which they are used. A previous solution, shown in FIG. 11, involved integration in an integrator 1102 of analog data from a touch sensor array over several transmission or Tx cycles, conversion of the analog data to digital data using an analog-to-digital converter (ADC) 1104, and summation of the digital data in a summator 1106. This approach maximizes integration time of analog data followed by averaging of the digital data. While effective for signals without noise or with small random noises it is not effective in the case of sources of larger, regular noise, such as charger and LCD noises.

Figure 12:
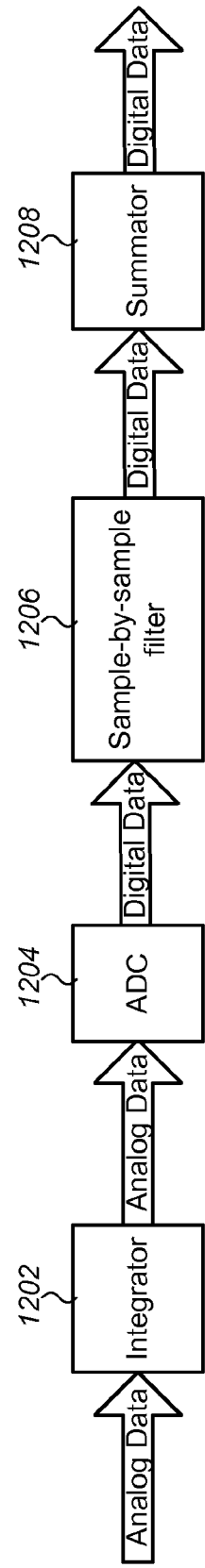
FIG. 12 illustrates one embodiment of a method for suppressing noise in a touch sensor array using sample-by-sample filtration of digital data.

FIG. 12 illustrates an embodiment of a method for suppressing noise in a touch sensor array using sample-by-sample filtration of digital data. Briefly, the method involves sequentially integrating in an integrator 1202 charge or analog data from each of a plurality of sensing nodes or capacitors in a touch sensor array (not shown in this figure), converting the analog data to digital data in an ADC 1204 to digital data including sample capacitance values or sample values corresponding to a measured capacitance for each of the sensing capacitors. The digital data is then filtered or pre-filtered in one or more filters 1206 on a cycle-by-cycle or sample-by-sample basis prior to summation to separate noise from useful information. By sample-by-sample it is meant either analog to digital conversion (ADC) digital data after a full transmission (Tx) cycle or period, or a sum of positive and negative half Tx periods in analog or digital form. Thus, a sample can be a sum of a number of positive and negative cycles. By sample or sample value it is meant cycle or sample data for every channel and as result for every single node or capacitive sensor. The filtered sample values are then summed in a summator 1208 prior to storing in the memory or memory array (not shown in this figure) of a touch sensing system or hardware accelerator, and using the data to determine a position of at least one contact on the array according to the filtered sample values. The location of the at least one contact on the touch sensor array may then be used to detect gestures, move a cursor across a display unit, or perform other user interface operations.

Figure 13:
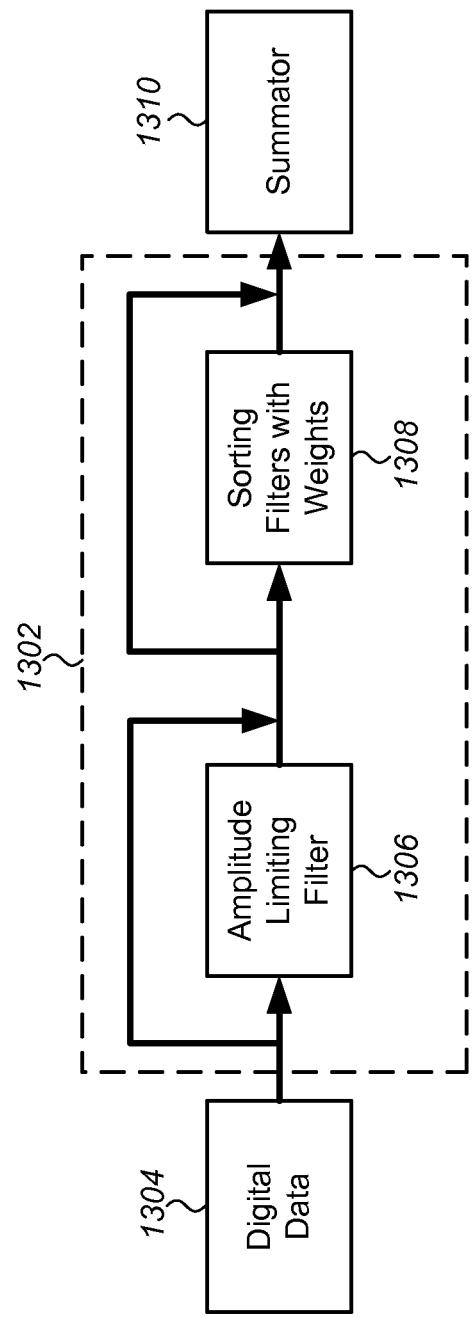
FIG. 13 is a block diagram illustrating one embodiment of a sample-by-sample filter including an amplitude limiting filter and sorting filters with weights.

FIG. 13 illustrates one embodiment of a sample-by-sample filter 1302 including an amplitude limiting filter and sorting filters with weights. Referring to FIG. 13, the filter 1302 receives digital data 1304 from an ADC (not shown) and filters the data through a first filter stage or filter 1306 including one or more amplitude limiting filters (ALF) and then through a second filter stage or filter 1308 including one or more sorting filters with weights (SFW). The filtered digital data, which include sample values corresponding to a measured capacitance for each of the sensing capacitors, is then summed or accumulated in a summator 1310. Note that each filter 1306 and 1308 can be by-passed or disabled. Enabling (disabling) of filters may be defined by filters or can be set by different parts of device.

Figure 14:
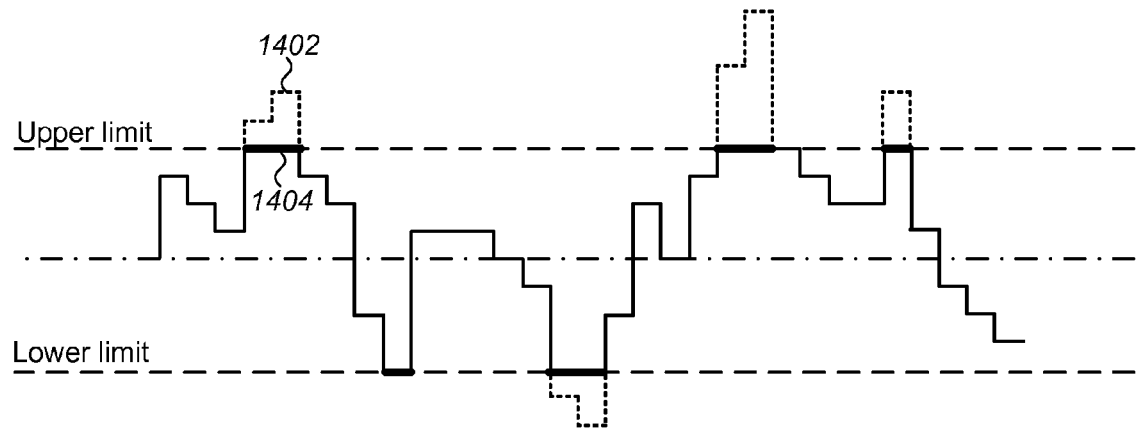
FIG. 14 illustrates a sequence of sample values filtered by one embodiment of a replace on limit amplitude limiting filter.

The ALF 1306 can be configured to replace sample values having a digital voltage or value greater than an upper limit value or less than a lower limit value with sample values having a value less than the upper limit value or greater than the lower limit value. Generally, replacement ALFs are applied to reduce huge noise (typically with some forms of saturation) and as result improve signal-to-noise ratio (SNR). For example, the ALF 1306 can be a replace on limit amplitude limiting filter configured to replace sample values exceeding the upper or lower limit values with the upper or lower limit values. FIG. 14 illustrates a sequence of sample values filtered by one embodiment of a replace on limit value ALF 1306. Referring to FIG. 14, when a sample value of the digital data exceeds a specified upper or lower limit values (marked by the dashed lines 1402 in FIG. 14), it will be replaced by the corresponding value of limit value (marked by the heavy lines 1404). Unmarked solid lines in FIG. 14 indicate unchanged sample values. This type of replace on limit ALF 1306 can prevent nonlinear effects of channel saturation caused by noise and achieve a more symmetric amplitude of noised signal relatively defined value, for example a baseline. This also results better SNR.

Figure 15:
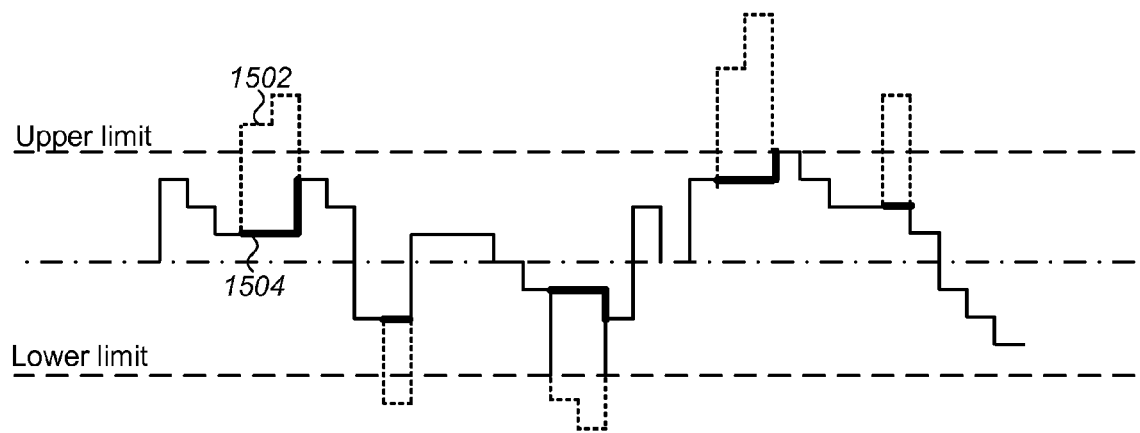
FIG. 15 illustrates a sequence of sample values filtered by one embodiment of a replace on last correct value amplitude limiting filter.

In another embodiment, the ALF 1306 can be configured to replace sample values exceeding the upper or lower limit values with the last correct value not exceeding the upper or lower limit values. FIG. 15 illustrates a sequence of sample values filtered by one embodiment of a replace on last correct value ALF 1306. Referring to FIG. 15, when a sample value of the digital data exceeds a specified upper or lower limit values (marked by the dashed lines 1502 in FIG. 15), it will be replaced by the corresponding value of a last or preceding correct value (marked by the heavy lines 1504) that does not exceed specified upper or lower limit values. Unmarked solid lines in FIG. 15 indicate unchanged sample values. It will be understood that such an approach makes the preceding correct values more significant, that is, they have bigger weights than another values. This type of replace on limit ALF 1306 similarly to FIG. 14 can prevent nonlinear effects of channel saturation caused by noise and achieve a more symmetric amplitude of noised signal relatively defined value, for example a baseline. This also results better SNR. A further advantage of this type of ALF is that by replacing an out of limit value with a value that corresponds to that of a last allowed sample amplitude, the ALF is less sensitive to asymmetry between the upper limit and lower limit relative to a baseline or signal value without noise.

Figure 16:
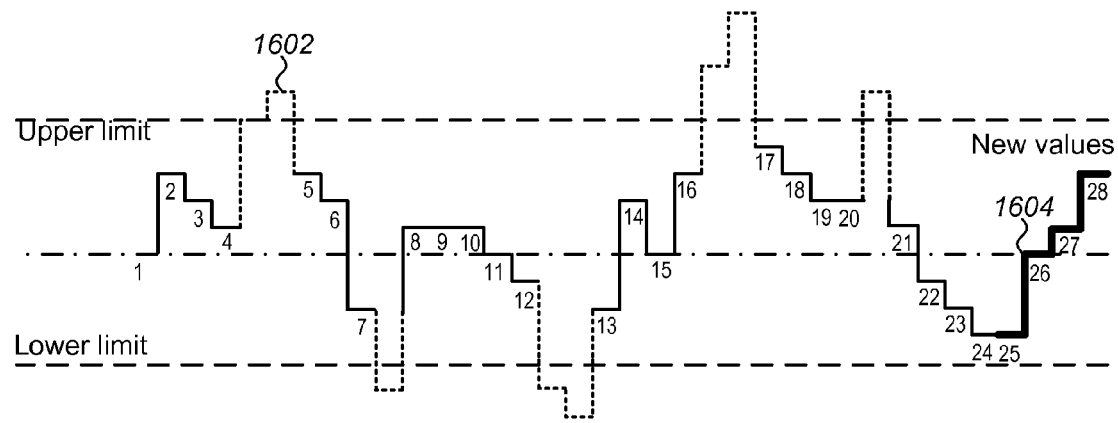
FIG. 16 illustrates a sequence of sample values filtered by one embodiment of a rejecting amplitude limiting filter.

In another embodiment, the ALF 1306 can be a rejecting amplitude limiting filter configured to reject sample values having a digital voltage or value greater than an upper limit value or less than a lower limit value. As the filter rejects sample outliers, the amount or number of discrete input sample values becomes larger than the amount of (filtered) output sample values. FIG. 16 illustrates a sequence of sample values filtered by one embodiment of a rejecting amplitude limiting filter. Referring to FIG. 16, when a sample value of the digital data exceeds a specified upper or lower limit values (marked by the dashed lines 1602 in FIG. 16) it will be rejected and not included in further filtering or processing to determine a position of at least one contact on the touch sensor array.

It will be understood difficulties can arise if a defined number of sample values must be collected to allow processing. To address this situation, it is possible to set an upper limit on the maximum amount of rejected sample values, and/or compensated for the rejected sample values by inclusion of added sample values added to the end of the sequence of sample values. By added sample values it is meant sample values beyond some number of samples planned to collect samples during a period of time. For example, in the embodiment shown in FIG. 16, the ALF 1306 is configured to collect data until data point or sample value 24. However, eight sample values, marked by the dashed lines 1602, collected during this period have been rejected. So starting from the sample value marked 24 on the right side of the sequence of sample values the collection period is extended to receive an extra 8 samples sample values numbered 25 to 28, marked by the heavy lines 1604) are added to the end of the sequence of sample values. Note, it is possible in certain embodiments continue to reject some sample values from beyond sample value 24 if a specified maximum amount of rejected sample values for the ALF 1306 has not been reached.

Figure 17:
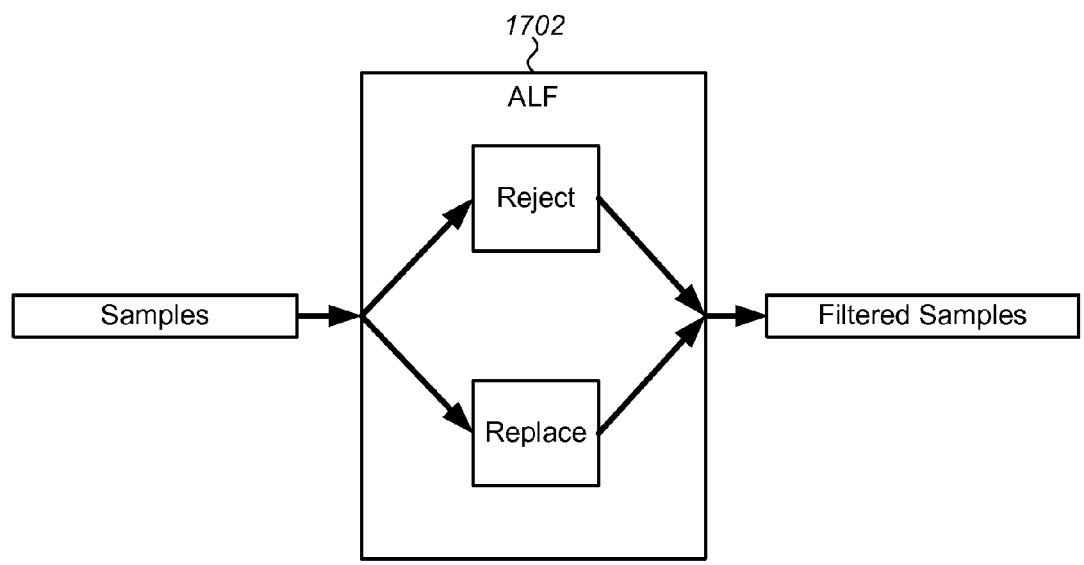
FIG. 17 illustrates a block diagram of one embodiment of a combined reject and replace amplitude limiting filter.

In another embodiment illustrated in FIG. 17 the amplitude limiting filter can be a combined reject and replace ALF 1702. In the embodiment shown in FIG. 17 the sample values in digital data received from a channel can be separated into two flows, a first flow of sample values meeting a defined criteria and which are rejected, and a second flow of sample values not meeting the defined criteria and which are replaced if the a number (N) of sample values are rejected. This approach allows discarding of the false or excessively noisy sample values, and then fills in the digital data with sample values not exceeding the upper or lower limit values. As a result, the number of scans (or forecast refresh rate) performed prior to storing the filtered digital data in a memory array or two-dimensional map of data elements in a hardware accelerator of the touch sensing system is reduced.

It will be understood that for the combined reject and replace ALF 1700 to operate correctly, the sample values have to be filtered in specific way. In some embodiments, a reject or replace ALF, or a combined reject and replace ALF 1700, could add sensitivity on low-frequency noise if the ALF is rejecting and/or replacing different numbers of positive or negative samples, or there is a significant difference in the positive and negative samples rejected or replaced. One solution is to configure the ALF to operate to keep the number of positive and negative samples rejected or replaced substantially the same or equal. For example, the combined reject and replace ALF 1700 can be configured to operate to reject full positive and negative samples together, that is in pairs.

In other embodiments, the sample-by-sample filter further includes, or includes instead of an amplitude limiting filter, a sorting filter with weights (SFW). These nonlinear filters are particularly useful to suppress noise spikes. In general, such filters perform at least two mathematical operations on the sample values: sorting and multiplying sorted sample values by varying amounts or weights. Size or number of the sorted sample values is defined by a sliding window or aperture of the SFW. For example, if $x_0, \ldots, x_{n-1}$ is a sorted set of sample values for a SFW with a sliding window of size n, and weights for sample values of $ws_0, \ldots, ws_{n-i}$, then result of filtering is given by the following equation:

$$y = \text{sum}(ws_i * \text{sort}(x_i))/\text{sum}(ws_i) = \qquad (1)$$
$$(ws_0 x_0 + \ldots + w_i x_i + w_{i+1} x_{i+1} + \ldots + ws_{n-1} x_{n-1})/$$
$$(ws_0 + \ldots + w_i + w_{i+1} + \ldots + w_{n-1}),$$

where sort($x_i$) mean sorting operation $x_{i-1} \leq x_i \leq x_{i+1}$.

Figure 18:
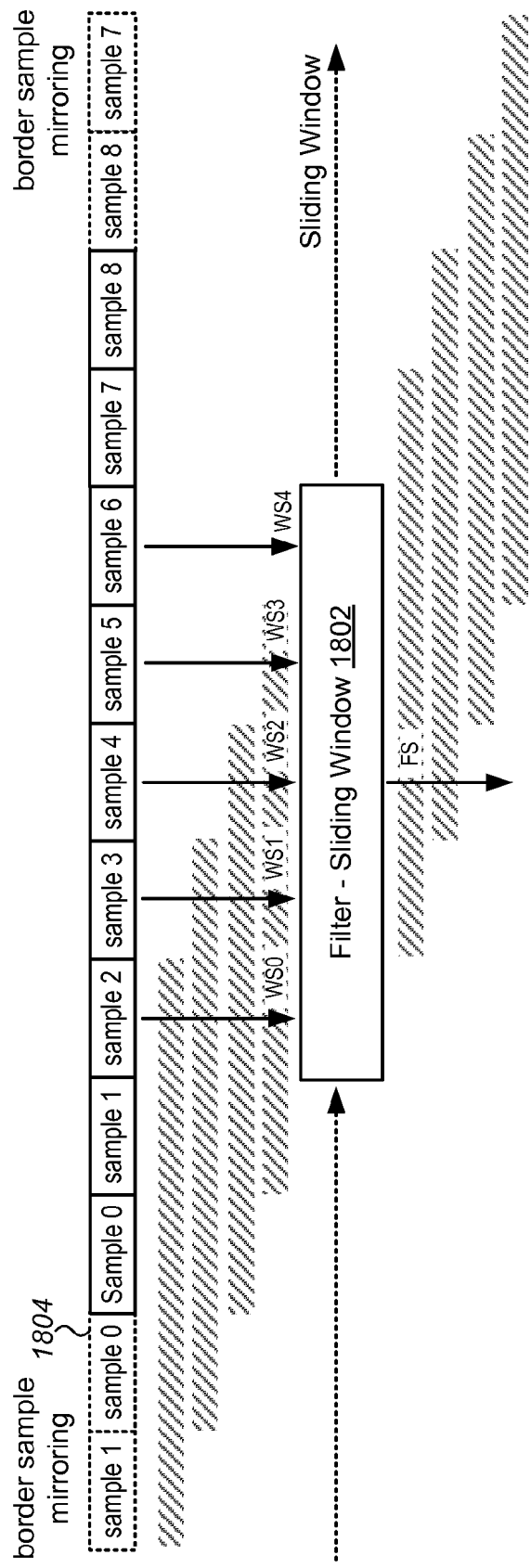
FIG. 18 illustrates one embodiment of a process for filtering a sequence of sample values using sorting filters with weights.

By selecting the window size and defining different weights it is possible to create different types of SFW filters having different filtering properties. For example, FIG. 18 illustrates one embodiment of a process for filtering a sequence of sample values (Sample 0-Sample 7) using a median filter (MF) by selecting weights (WS0-WS4) of [0,0, 1,0,0,] and a sliding window having a sample aperture of five (5). The median filter provides effective noise filtration when the duration of noise pulse t is less than half of the sample aperture W or frequency of signal sampling. A second criteria of median filtration to eliminate stochastic noise as follows:

$$\frac{T}{W} > t, \qquad (2)$$

where T is a period of noise repetition, t is a time duration of noise and W, the aperture, is set equal to 3.

That is, it has been found that an MF-type SFW filter reduces noise spikes most effectively when the frequency of signal sampling is at least 3 time higher than the noise frequency. It has been found that most effective filters include apertures of 5 or 7.

Different realization MF-type SFW filters for sample-by-sample filtration will now be described with reference to FIGS. 18 to 22.

As noted above, FIG. 18 illustrates one embodiment of a process for filtering a sequence of sample values using a median filter with a sliding window 1802 having a five sample aperture. In addition, FIG. 18 illustrates an embodiment in which border or boundary sample values (indicated by dashed lines 1804) at the start and at the end of the sample sequence are mirrored, to allow for the sliding window to extend beyond the boundaries of the sample value sequence. Note that in the embodiment shown in FIG. 18 the sliding window moves over 9 different positions, and that the boundary or border sample mirror ensures the same amount or number of sample values is included in determining each of the 9 filtered sample (FS) values.

Figure 19:
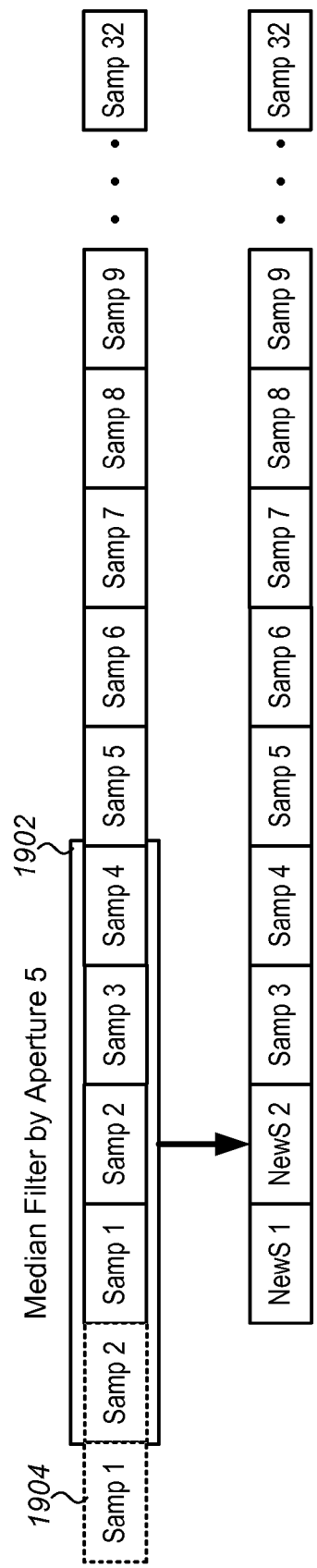
FIG. 19 illustrates one embodiment of a process for filtering a sequence of sample values using a median filter with a sliding window having a five sample aperture.

An alternative approach to accounting for boundary sample values in an MF-type SFW filter is illustrated in FIG. 19. The MF-type SFW filter of FIG. 19 uses a sliding window 1902 having a five sample aperture and an imaginary shift, in which the boundary samples (indicated by dashed lines 1904) are not mirrored but copied using a shift register or procedure.

Referring to FIG. 19 it is noted that the value of sample value 2 (Samp 2) is copied or shifted to the boundary sample preceding sample value 1 (Samp 1).

Figure 20:
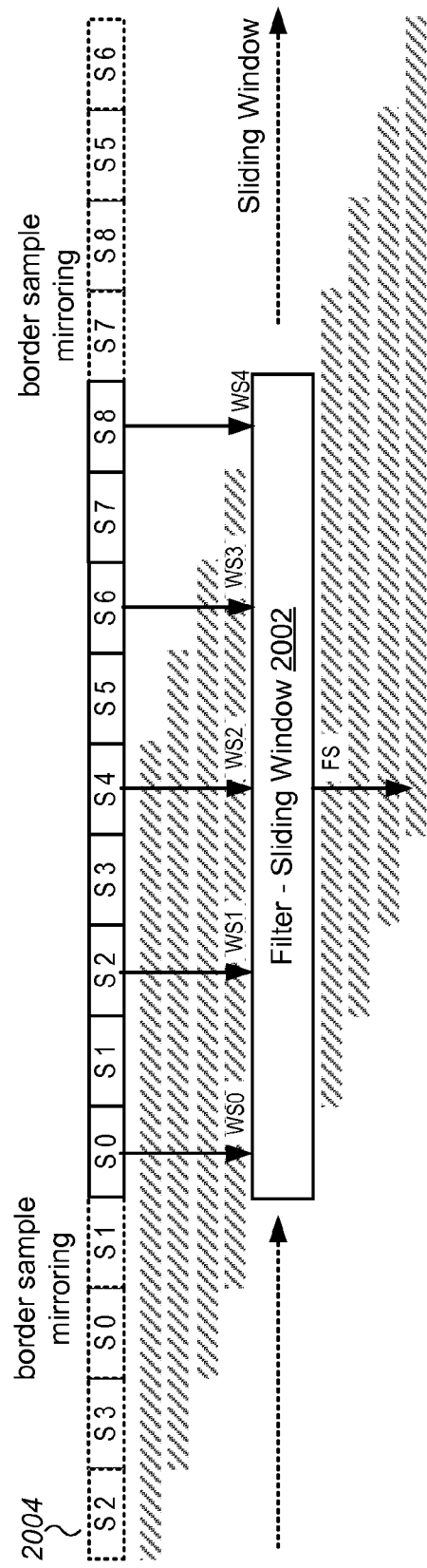
FIG. 20 illustrates one embodiment of a process for filtering a sequence of sample values using sorting filters with weights and border sample mirroring.

In yet another embodiment illustrated in FIG. 20, the MF-type SFW filter can include separation between even and odd numbered sample values. Referring to FIG. 20, in this embodiment the sliding window 2002 alternately skips every other sample value, i.e., only even or odd sample values are selected depending on the sliding window position, and after filtering of the first (even or odd) sample sequence, a second (odd or even) sample sequence will be filtered. Next the result of positive and negative samples are added together (summation). This embodiment enables the use of the same amount of positive and negative samples substantially without increasing the influence of low frequency noise on the system. As with the embodiments of FIGS. 18 and 19, boundary sample values (indicated by dashed lines 2004) at the start and at the end of the sample sequence can be mirrored or copied using a simple shift to ensure the same amount or number of sample values is included in determining each of the filtered sample (FS) values.

Figure 21:
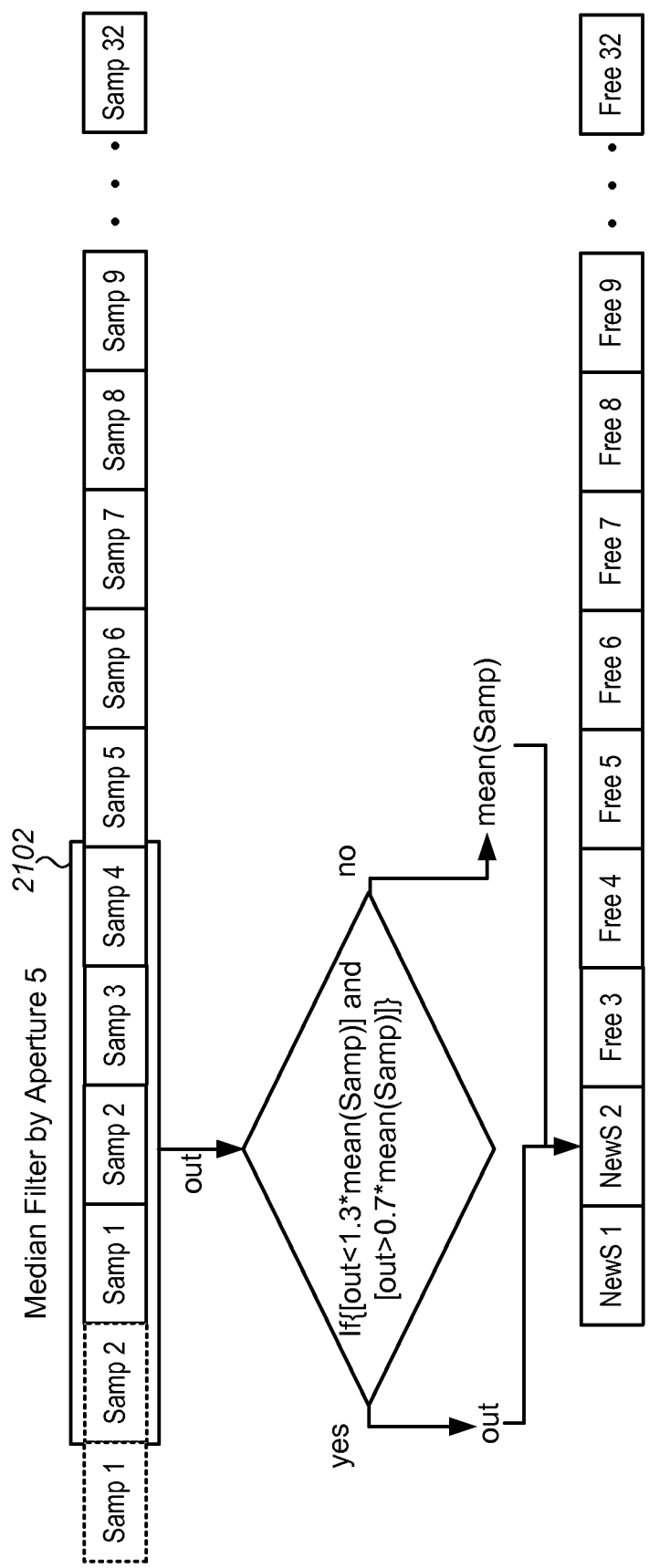
FIG. 21 illustrates one embodiment of a process for filtering a sequence of sample values using a conditional median filter with a sliding window having a five sample aperture.

FIG. 21 illustrates one embodiment of a process for filtering a sequence of sample values using a conditional median filter with a sliding window 2102 having a five sample aperture. Referring to FIG. 21, by a conditional median filter it is meant a median or MF-type SFW filter that first sorts the sample values in a filter window in rising order and next calculates some condition to return one from two results.

FIG. 21 illustrates one embodiment of a process for filtering a sequence of sample values using a conditional median filter with a sliding window having a five sample aperture. By a conditional median filter it is meant a median filter (MF) or MF-type SFW filter that is configured to sort a sequential number (N) of sample values into sorted sample values, calculate or determine at least one condition of the sorted sample values, and if that condition is met return one of two results. In the embodiment shown in FIG. 21, an MF-type SFW filter is configured to sort a number (N) of sequential sample values, calculate a mean of the sample values (mean(Samp)) determine a median of the sample values, and compare the mean to the median of the sample values. If the output mean of the filter output is less than 1.3 mean of the sample values (mean(Samp)) and greater than 0.7 times the mean(Samp), the condition is met and the output of the filter (out) is used as a new sample value (NewS 2) in place of the unfiltered sample value (Samp 2). If the conditions are not met the mean of the sample values (mean(Samp is used as the new sample value (NewS 2).

For example, assuming the sliding window size is 5, as shown in FIG. 21, and inputs to the sort operation are: Samp2, Samp1, Samp2, Samp3 and Samp4. After sorting, the list of sorted sample values (SS), corresponding to $x_0, \ldots, x_{n-1}$ in equation 1 above, from smallest to largest sample is: SS0, SS1, SS2, SS3, and SS4. The smallest value is SS0, the median value is SS2, the largest value is SS4 and the center value is Samp2. Then if the dynamic range (difference between maximal and minimal values of sorted sample values) of the sample values in the sliding window exceeds a threshold (some value), the output is the median of the sliding window (SS2), otherwise the output is the center sample (Samp2).

It will be understood that different conditions can be applied to the conditional median filter, such as determining a difference between median and average sample values multiplied by a coefficient. If this difference is small, conditional median filter will return mean sample value, otherwise the median sample value.

Figure 22:
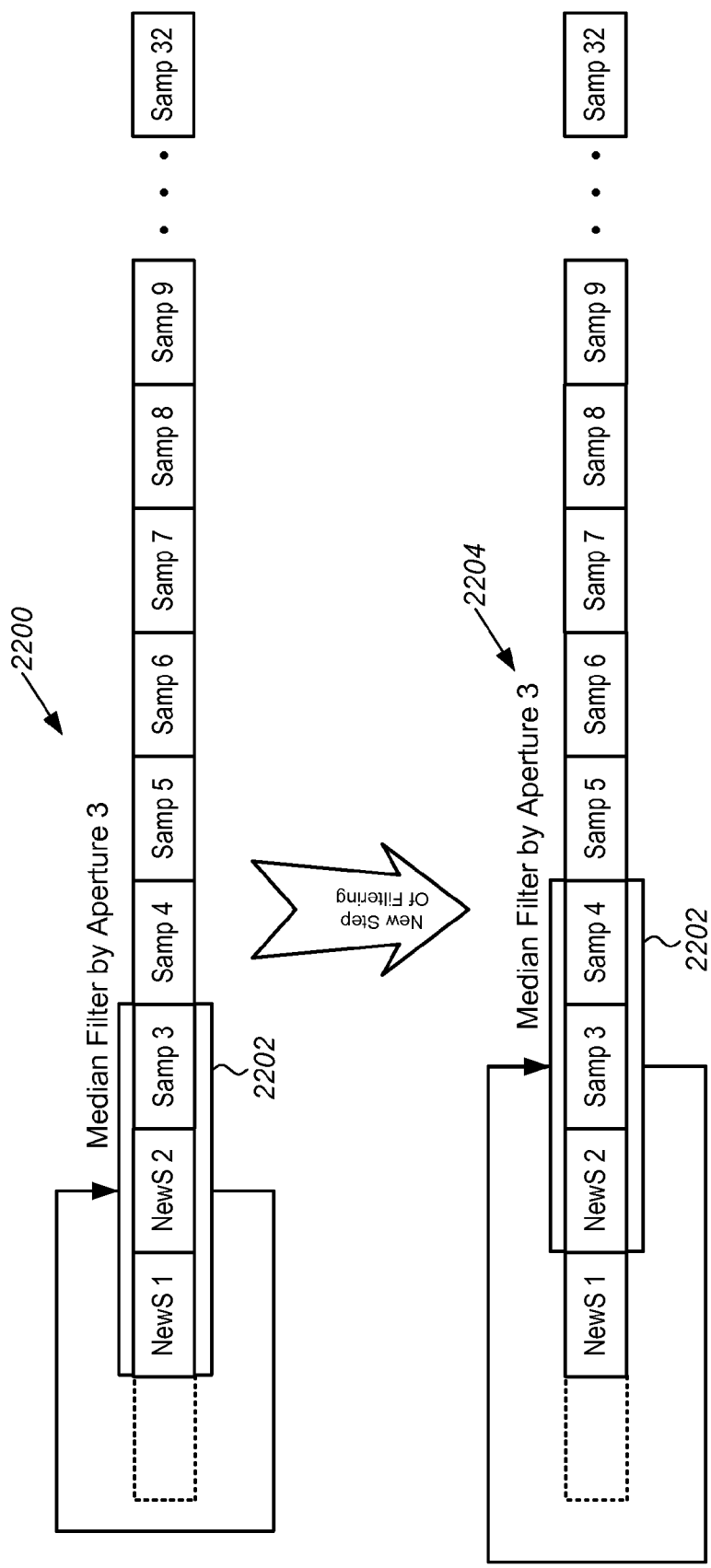
FIG. 22 illustrates one embodiment of a process for filtering a sequence of sample values using an Infinite impulse Response (IIR) filter with a sliding window having a three sample aperture.

FIG. 22 illustrates one embodiment of a process for filtering a sequence of sample values using an Infinite impulse response (IIR)-like filter in which the output of a first filter step 2200 having a sliding window 2202 with three sample aperture is used in a second filter step 2204 of filtration wherein the window is shifted by one or more samples. For example in the embodiment shown the output of first filter step 2200, NewS 2, used as one of three samples (NewS 2, Samp 3 and Samp 4) used in the second filter step 2204. Although not shown it will be appreciated that as with the embodiments of FIGS. 18 and 19, boundary sample values (indicated by dashed lines) at the start and at the end of the sample sequence can be mirrored or copied using a simple shift to ensures the same amount or number of sample values is included in determining each of the filtered sample (FS) values.

Figure 23:
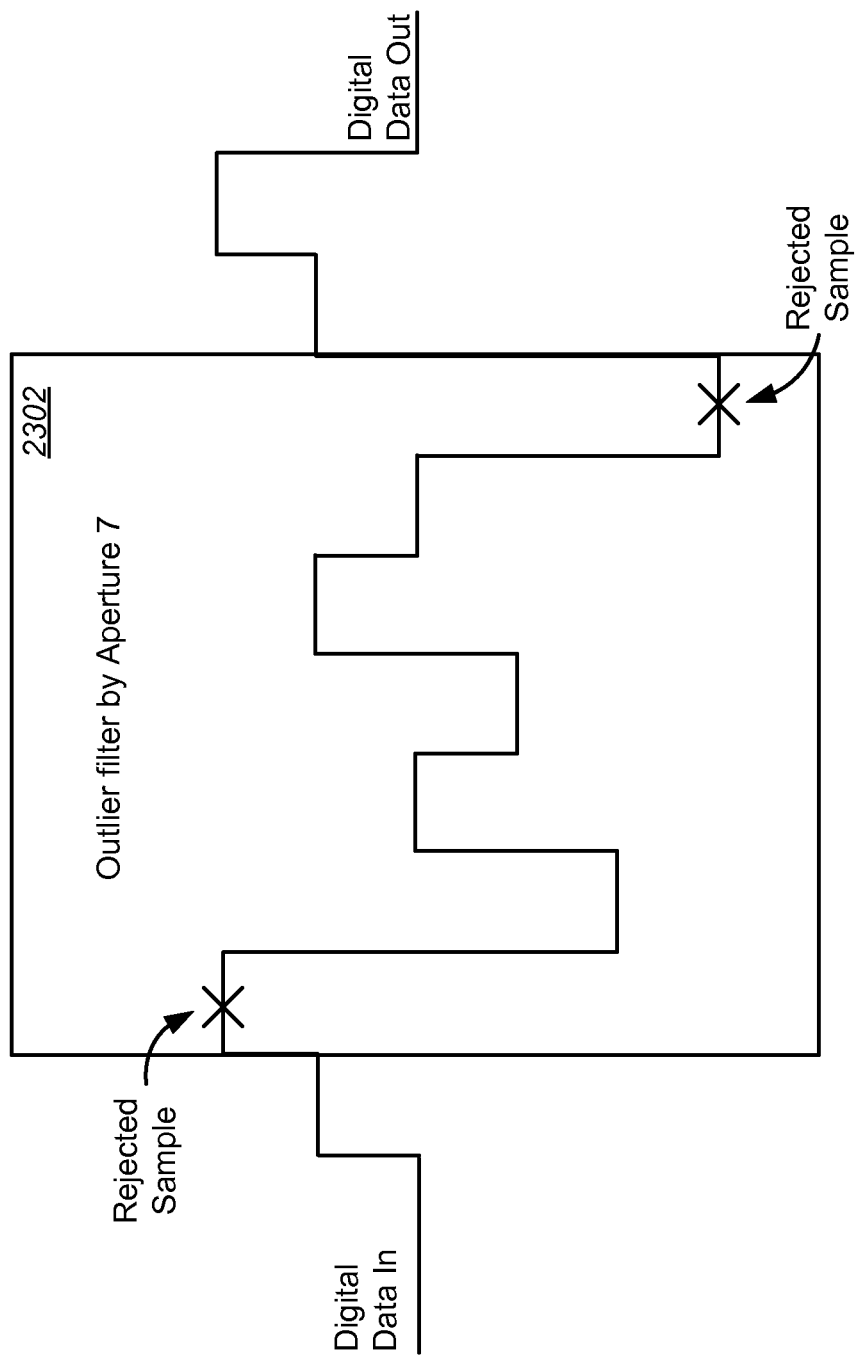
FIG. 23 illustrates one embodiment of an outlier filter with a sliding window having a seven sample aperture.

In other embodiments, the sorting filter with weights (SFW) includes instead of median filter an outlier filter used to reject maximum and minimum values. Suitable outlier filters include sliding windows with an odd number of sample apertures, i.e., 5, 7, and have weights, such as [0,1,1,1,0,], [0,1,1,1,1,1,0,]. FIG. 23 illustrates one embodiment of one such outlier filter 2302 with a sliding window having a seven sample aperture. These filters provide an intermediate performance between MF-type SFW filters and averaging, and are particularly suited to applications in which the digital data is only slightly noisy.

Figure 24:
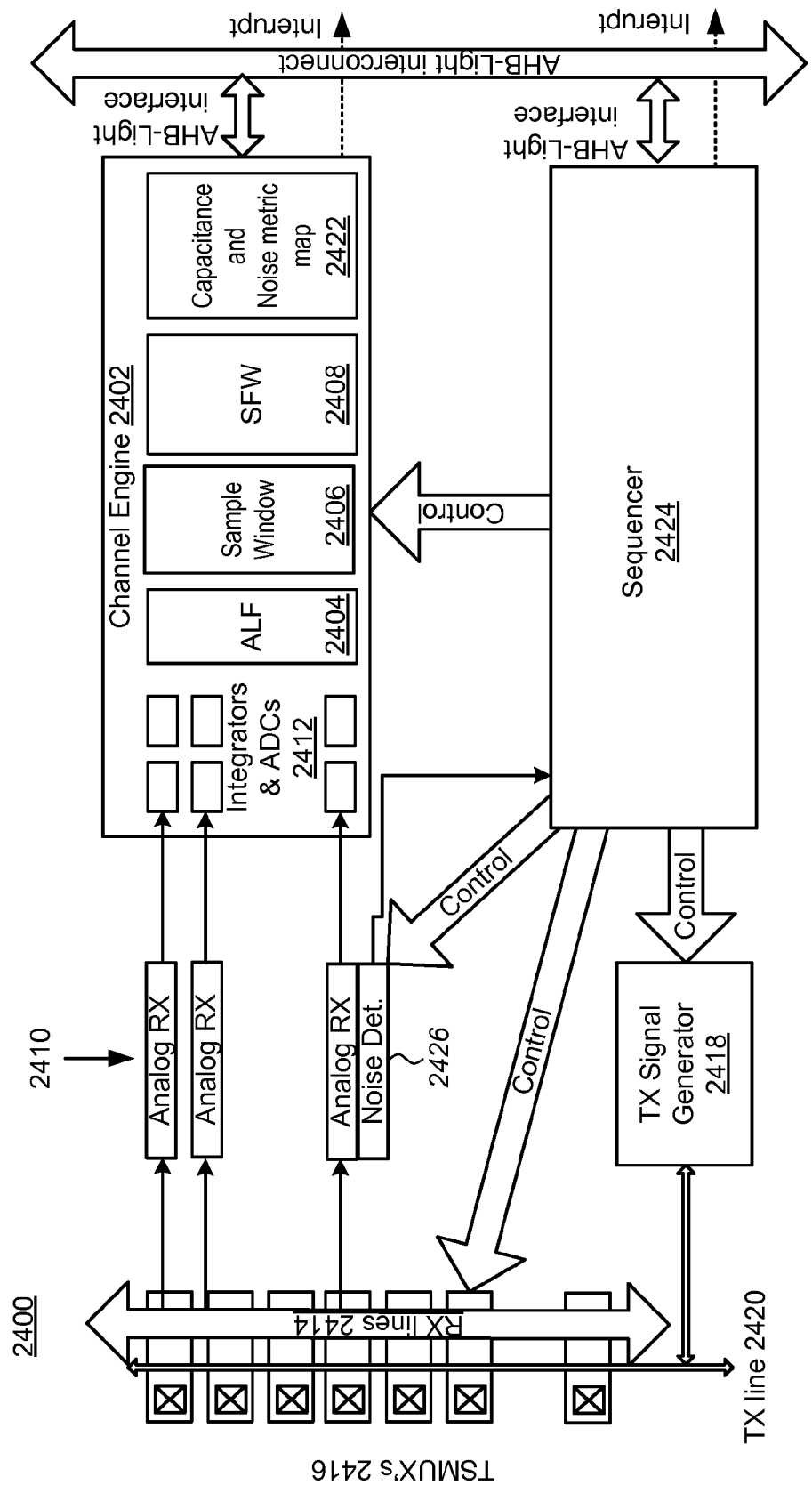
FIG. 24 is a block diagram illustrating an embodiment of a touch sensing system including an amplitude limiting filter and sorting filters with weights for suppressing noise in a touch sensor array.

FIG. 24 is a block diagram illustrating an embodiment of a touch sensing system (TSS 2400) including a channel engine 2402 with one or more ALFs 2404, sample window 2406 and sorting filters with weights (SFWs 2408) for suppressing noise in a touch sensor array (not shown in this figure). For purposes of clarity, many of the details of touch sensing systems that are widely known and are not relevant to the present invention have been omitted from the following description.

Referring to FIG. 24, the TSS 2400 further includes multiple analog receive (RX) channels 2410 electrically coupled to sample integrators/ADCs 2412 in the channel engine, and through multiple RX lines 2414 to touch screen multiplexers (TSMUX 2416) to connect to receive electrodes in the touch sensor array, and a TX component or signal generator 2418, which produces a TX signal to be supplied to transmit electrodes of touch sensor array through a TX line 2420 and/or demultiplexor (not shown in this figure). The channel engine 2402 is responsible for the creation of samples based on the data as received from the analog RX channels 2410. Furthermore, it applies the filters (ALF 2404 and SFW 2408) to the samples and produces a two-dimensional capacitance and noise metric map 2422 of the scanned array. This capacitance and noise metric map 2422 is further processed by a CPU core or ARM (not shown in this figure) to execute capacitance baselining routines, adjust thresholds for noise and contact detection, identify and track contacts on the array, or process gestures.

In addition to the channel engine 2402, the TX signal generator 2418, the RX channels 2410 and RX lines 2414 the TSS 2400 further includes a sequencer 2424 to control both digital and analog components TSS, such as the channel engine, the TX signal generator, the RX channels and RX lines. Generally, the TSS 2400 further includes a noise detection circuit 2426, such as an listen (LX) channel, to listen for noise, such as that arising from an adjacent LCD, on RX channels 2410 that is sufficiently high for the sequencer 2424 to operate the channel engine 2402 to filter the noise. The TSS 2400 has two 32-bit AHB-Light interfaces: one for the sequencer 2424 and one for the channel engine 2402. Similarly, both the sequencer 2424 and the channel engine 2402 have a dedicated interrupt output signals to allow for separate ISRs to address channel engine capacitance map data processing and sequencer control data setting. In addition, it will be appreciated that the separation of sequencer 2424 and channel engine 2402 functionality into two components allows for independent design and verification.

Figure 25:
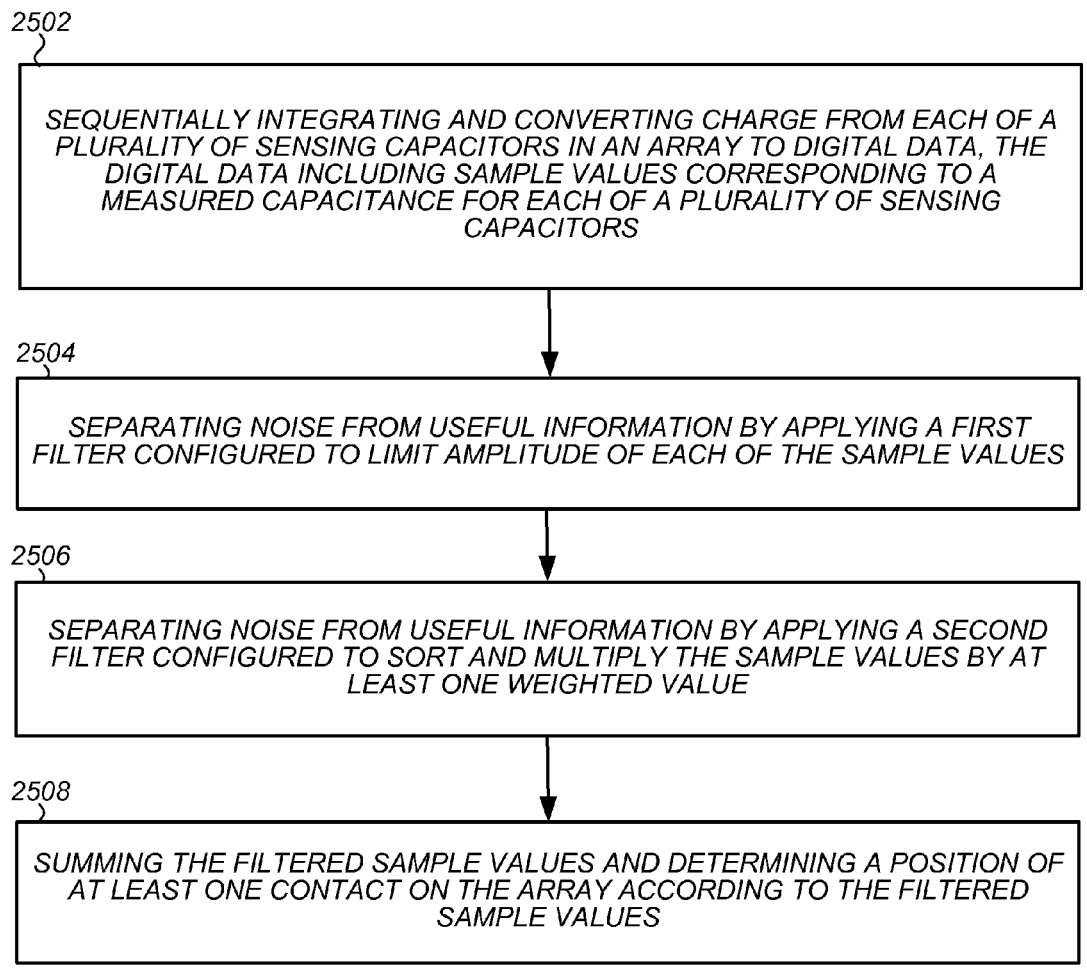
FIG. 25 illustrates one embodiment of a method for suppressing noise in a touch sensor array by sample-by-sample filtration of digital data using an amplitude limiting filter and sorting filters with weights.

FIG. 25 illustrates one embodiment of a method for suppressing noise in a touch sensor array by sample-by-sample filtration of digital data using an amplitude limiting filter and sorting filters with weights. Referring to FIG. 25, the method begins with sequentially integrating and converting charge from each of a plurality of sensing capacitors in a touch sensing array to digital data (step 2502). As noted above, the digital data includes sample values corresponding to a measured capacitance for each of a plurality of sensing capacitors in step 2502. Next, noise is separated from useful information by applying a first filter configured to limit amplitude of each of the sample values (step 2504), and/or applying a second filter configured to sort and multiply the sample values by at least one weighted value (step 2506). Finally, the filtered sample values are summed and used to determine a position of at least one contact on the array according to the filtered sample values (step 2508).

Optionally, the filtered and summed sample values can be stored in a memory array or two-dimensional map of data elements in a hardware accelerator of the touch sensing system to identify a local maxima in a fast a predictable time as described above.

Thus, embodiments of a hardware accelerator and sample-by-sample filtering have been described. Although the present disclosure has been described with reference to specific exemplary embodiments, it will be evident that various modifications and changes may be made to these embodiments without departing from the broader spirit and scope of the disclosure. In particular, certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
sequentially integrating and converting charge from each of a plurality of sensing capacitors in an array to generate digital data, the digital data including sample values corresponding to a respective measured capacitance for each of the plurality of sensing capacitors;
forming a sliding window of the digital sample values using a sample aperture of size W, wherein W is an integer greater than 2, wherein a position of each sample value within the sliding window is based on a sequence in which it was generated, and wherein border values are mirrored to enable the sliding window to include W samples for each position of the sliding window;
for each respective position of the sliding window:
sorting the respective sample values in the sliding window;
multiplying each sorted sample value in the sliding window by a respective predetermined weight value based on a respective sort position of the sample valued within the sliding window, wherein the weights include a plurality of non-zero values; and
summing products of the multiplied sample values, and outputting the sum as a filtered sample value for the respective position of the sliding window;
summing a plurality of the filtered sample values to form an accumulated sample value; and
using the accumulated sample value to determined a position of at least one contact on the touch sensor array.

2. The method of claim 1, further comprising applying an amplitude filter configured to limit amplitude of each of the digital sample values.

3. The method of claim 2, wherein the amplitude filter is configured to replace digital sample values having a value greater than an upper limit value or less than a lower limit value.

4. The method of claim 3, wherein the amplitude filter is configured to replace digital sample values having a value greater than the upper limit value with the upper limit value, and to replace digital sample values having a value less than the lower limit value with the lower limit value.

5. The method of claim 3, wherein the amplitude filter is configured to replace digital sample values having a value greater than the upper limit value with the digital sample value of a last preceding sample having a digital sample value lower than the upper limit value, and to replace digital sample values having a value less than the lower limit value with the digital sample value of a last preceding sample having a digital sample value greater than the lower limit value.

6. The method of claim 2, wherein the amplitude filter is configured to reject digital sample values having a value greater than an upper limit value or less than a lower limit value.

7. The method of claim 6, wherein the amplitude filter is further configured to replace digital sample values having a value greater than an upper limit value or less than a lower limit value when a first number (N) of digital sample values have been rejected within second a number (M) of the digital sample values.

8. A system comprising:
an analog front end configured to sequentially integrate and convert charge from each of a plurality of sensing capacitors of a touch sensor array to digital data; and
a channel engine to receive digital data from the analog front end and generate of sample values corresponding to a measured capacitance for the plurality of sensing capacitors, the channel engine including:
- a sorting filter with weights (SFW) including a sliding window having a sample aperture of size (W), wherein W is an integer greater than 2, wherein a position of each sample value within the sliding window is based on a sequence in which it was generated, and wherein border values are mirrored to enable the sliding window to include W samples for each position of the sliding window, the SFW configured to:
  for each respective position of the sliding window:
    sorting the respective sample values in the sliding window;
    multiply each sorted sample value in the sliding window by a respective predetermined weight value based on a respective sort position of the sample value within the sliding window, wherein the weights include a plurality a non-zero values; and
    sum products of the multiplied sample values, and output the sum as a filtered sample value for the respective position of the sliding window; and
a digital section configured to:
  sum a plurality of the filtered sample values to form an accumulated sample value; and
  use the accumulated sample value to determined a position of at least one contact on the touch sensor array.

9. The system of 8, further comprising an amplitude filter configured to limit amplitude of each of the digital sample values.

10. The system of claim 8, wherein the channel engine further comprises a hardware accelerator configured to store a subset of measured capacitance values, the subset of measured capacitance values comprising at least the capacitance values used for determination of a node as a local maximum.

11. The system of claim 9, wherein the amplitude filter is configured to replace digital sample values having a value greater than an upper limit value or less than a lower limit value.

12. The system of claim 11, wherein the amplitude filter is configured to replace digital sample values having a value greater than the upper limit value with the upper limit value, and to replace digital sample values having a value less than the lower limit value with the lower limit value.

13. The system of claim 11, wherein the amplitude filter is configured to replace digital sample values having a value greater than the upper limit value with the digital sample value of a last preceding sample having a digital sample value lower than the upper limit value, and to replace digital sample values having a value less than the lower limit value with the digital sample value of a last preceding sample having a digital sample value greater than the lower limit value.

14. The system of claim 9, wherein the amplitude filter is configured to reject digital sample values having a value greater than an upper limit value or less than a lower limit value.

15. The system of claim 14, wherein the amplitude filter is further configured to replace sample digital values having a value greater than an upper limit value or less than a lower limit value when a first number (N) of digital sample values have been rejected within a second number (M) of the digital sample values.

* * * * *

UNITED STATES PATENT AND TRADEMARK OFFICE
CERTIFICATE OF CORRECTION

PATENT NO. : 9,377,909 B2  
APPLICATION NO. : 14/018596  
DATED : June 28, 2016  
INVENTOR(S) : Karpin et al.

Page 1 of 1

It is certified that error appears in the above-identified patent and that said Letters Patent is hereby corrected as shown below:

In the claims,

Claim 7, col. 18, line 66, please delete "within second a number" and insert --within a second number--;

Claim 8, col. 19, line 32, please delete "to determined a" and insert --to determine a--.

Signed and Sealed this
Twenty-third Day of August, 2016

Michelle K. Lee
*Director of the United States Patent and Trademark Office*